(12) United States Patent
Lepek et al.

(10) Patent No.: US 11,142,317 B2
(45) Date of Patent: Oct. 12, 2021

(54) METHOD AND APPARATUS FOR ARTIFICIAL DISTRIBUTION OF INSECTS OR SPRAY

(71) Applicant: Senecio Ltd., Kfar-Saba (IL)

(72) Inventors: Hanan Lepek, Kfar-Saba (IL); Rimon Arieli, Nesher (IL)

(73) Assignee: Senecio Ltd., Kfar-Saba (IL)

( * ) Notice: Subject to any disclaimer, the term of this patent is extended or adjusted under 35 U.S.C. 154(b) by 0 days.

(21) Appl. No.: 15/513,232

(22) PCT Filed: Sep. 21, 2015

(86) PCT No.: PCT/IL2015/050964
§ 371 (c)(1),
(2) Date: Mar. 22, 2017

(87) PCT Pub. No.: WO2016/046823
PCT Pub. Date: Mar. 31, 2016

(65) Prior Publication Data
US 2017/0297710 A1    Oct. 19, 2017

Related U.S. Application Data

(60) Provisional application No. 62/053,242, filed on Sep. 22, 2014.

(51) Int. Cl.
*B64D 1/18* (2006.01)
*B05B 7/14* (2006.01)

(52) U.S. Cl.
CPC ............. *B64D 1/18* (2013.01); *B05B 7/1459* (2013.01)

(58) Field of Classification Search
CPC ... B64D 1/10; B64D 1/12; B64D 1/16; B64D 1/18; A62C 3/0228; A62C 3/0242
(Continued)

(56) References Cited

U.S. PATENT DOCUMENTS 1,124,579 A * 1/1915 Ambursen .............. B28C 5/026
239/403
1,957,075 A   5/1934 Morgensen, Jr.
(Continued)

FOREIGN PATENT DOCUMENTS

CA       2654378      12/2007
CN     201585344       9/2010
(Continued)

OTHER PUBLICATIONS

Notice of Eligibility for Grant: Search Report and Examination Report Dated Apr. 3, 2018 From the Intellectual Property Office of Singapore Re. Application No. 11201704330W. (8 Pages).
(Continued)

*Primary Examiner* — Tuongminh N Pham

(57) ABSTRACT

A diffuser for distributing spray or insects from an aircraft is mounted on an aircraft and comprises a distribution tube connected to an insect source at a first end and open to the outside at a second end for distribution of the insects. A nozzle surrounds the second end and a tube cover surrounds the second end within the nozzle. The tube cover has an aerofoil, or wing-shaped, cross section. The nozzle shape sets up an air transition volume between the aircraft and ambient air designed for a maximum wind shear over any cubic centimeter volume within the air transition volume to be less than 60 km/h, and therefore allowing distribution of insects such as mosquitoes from the aircraft without damage, or allowing aerosols to be spread as large droplets.

3 Claims, 14 Drawing Sheets
(14 of 14 Drawing Sheet(s) Filed in Color)

(58) Field of Classification Search
USPC .......................................... 239/171; 244/136
See application file for complete search history.

(56) References Cited

U.S. PATENT DOCUMENTS

| | | | |
|---|---|---|---|
| 2,562,524 A * | 7/1951 | Burnum ................... | B64D 1/16 244/136 |
| 2,772,061 A | 11/1956 | Sellers | |
| 3,429,507 A * | 2/1969 | Jones ..................... | A01G 15/00 239/2.1 |
| 3,705,659 A | 12/1972 | MacKie | |
| 3,994,437 A | 11/1976 | Kitterman | |
| 4,260,108 A | 4/1981 | Maedgen, Jr. | |
| 5,148,989 A | 9/1992 | Skinner | |
| 5,794,847 A | 8/1998 | Stocker | |
| 5,927,004 A | 7/1999 | Stocker | |
| 6,783,006 B1 | 8/2004 | Sontag | |
| 8,408,164 B2 | 4/2013 | Robinson, Jr. | |
| 9,314,010 B2 | 4/2016 | Moreto et al. | |
| 2002/0050659 A1 | 5/2002 | Toreki et al. | |
| 2002/0068358 A1 | 6/2002 | Campbell et al. | |
| 2003/0188698 A1 | 10/2003 | Donaldson et al. | |
| 2005/0009444 A1 | 1/2005 | Davis et al. | |
| 2005/0103276 A1 | 5/2005 | Davis et al. | |
| 2008/0009585 A1 | 1/2008 | Catalfamo | |
| 2009/0226116 A1 | 9/2009 | Hill et al. | |
| 2010/0001124 A1 | 1/2010 | Feldman | |
| 2011/0001011 A1 | 1/2011 | Degiorgis et al. | |
| 2011/0132278 A1 | 6/2011 | Robinson, Jr. | |
| 2011/0180003 A1 | 7/2011 | Durnford et al. | |
| 2014/0079652 A1 | 3/2014 | Cooper et al. | |
| 2014/0246545 A1 | 9/2014 | Markov | |
| 2015/0122182 A1 | 5/2015 | Aldana et al. | |
| 2016/0219887 A1 | 8/2016 | Vickerson et al. | |
| 2017/0267344 A1 | 9/2017 | Lepek et al. | |
| 2017/0267346 A1 | 9/2017 | Lepek et al. | |
| 2018/0332817 A1 | 11/2018 | Lepek et al. | |

FOREIGN PATENT DOCUMENTS

| | | |
|---|---|---|
| CN | 103202269 | 7/2013 |
| CN | 203446381 | 2/2014 |
| EP | 0210447 | 2/1987 |
| EP | 2266879 | 12/2010 |
| FR | 2583256 | 12/1986 |
| WO | WO 03/000047 | 1/2003 |
| WO | WO 03/087322 | 10/2003 |
| WO | WO 2010/148498 | 12/2010 |
| WO | WO 2011/076773 | 6/2011 |
| WO | WO 2014/086932 | 6/2014 |
| WO | WO 2016/046823 | 3/2016 |
| WO | WO 2016/088127 | 6/2016 |
| WO | WO 2016/088128 | 6/2016 |
| WO | WO 2016/088129 | 6/2016 |

OTHER PUBLICATIONS

Search Report dated Oct. 24, 2017 from the Ministerio de Comercio e Industrias, La Direccion General del Registro de la Propiedad Industrial, Departamento de Patentes de la Republica de Panama, DIGERPIRe. Application No. 91656-01 and Its Translation Into English. (5 Pages).
Examination Report dated Aug. 27, 2018 From the Republica de Colombia, Superintendencia de Industria y Comercio Re. Application No. NC2017/0003905 and Its Translation Into English. (10 Pages).
Examination Report dated Aug. 15, 2017 From the Instituto Mexicano de la Propiedad Industrial, IMPI Re. Application No. MX/a/2017/007267. (2 Pages).
Examination Report dated Jul. 11, 2017 From the Republica de Colombia, Superintendencia de Industria y Comercio Re. Application No. NC2017/0006718 and Its Translation Into English. (5 Pages).
Translation of Examination Report dated Oct. 24, 2017 From Ministerio de Comercio e Industrias, La Direccion General del Registro de la Propiedad Industrial, Departamento de Patentes de la Republica de Panama Re. Application No. 91657-01. (2 Pages).
Examination Report dated Oct. 24, 2017 From Ministerio de Comercio e Industrias, La Direccion General del Registro de la Propiedad Industrial, Departamento de Patentes de la Republica de Panama Re. Application No. 91657-01. (2 Pages).
Search Report and the Written Opinion dated Nov. 2, 2017 From the Intellectual Property Office of Singapore, IPOS Re. Application No. 11201702171S. (9 Pages).
Translation of Status Report dated Sep. 15, 2017 From the Ministerio de Comercio e Industrias, La Direccion General del Registro de la Propiedad Industrial, Departamento de Patentes, DIGERPI, de la Republica de Panama Re. Application No. 91565-01. (3 Pages)
Status Report Dated Sep. 15, 2017 From the Ministerio de Comercio e Industrias, La Direccion General del Registro de la Propiedad Industrial, Departamento de Patentes, DIGERPI, de la Republica de Panama Re. Application No. 91565-01. (2 Pages).
Examination Report dated Jul. 6, 2017 From the Republica de Colombia, Superintendencia de Industria y Comercio Re. Application No. NC2017/0006705 and Its Translation Into English. (5 Pages).
Examination Report dated May 4, 2017 From the Republica de Colombia, Superintendencia de Industria y Comercio Re. Application No. NC2017/0003905 and Its Translation Into English. (8 Pages).
International Preliminary Report on Patentability dated Jun. 15, 2017 From the International Preliminary Examining Authority Re. Application No. PCT/IL2015/051180. (10 Pages).
Communication Relating to the Results of the Partial International Search dated Mar. 7, 2016 From the International Searching Authority Re. Application No. PCT/IL2015/051180.
Communication Relating to the Results of the Partial International Search dated Mar. 7, 2016 From the International Searching Authority Re. Application No. PCT/IL2015/051181.
International Preliminary Report on Patentability dated Feb. 17, 2017 From the International Preliminary Examining Authority Re. Application No. PCT/IL2015/051178. (21 Pages).
International Preliminary Report on Patentability dated Feb. 17, 2017 From the International Preliminary Examining Authority Re. Application No. PCT/IL2015/051181. (20 Pages).
International Preliminary Report on Patentability dated Dec. 21, 2016 From the International Preliminary Examining Authority Re. Application No. PCT/IL2015/050964. (11 Pages).
International Search Report and the Written Opinion dated Jun. 1, 2016 From the International Searching Authority Re. Application No. PCT/IL2015/051181.
International Search Report and the Written Opinion dated Mar. 4, 2016 From the International Searching Authority Re. Application No. PCT/IL2015/051178.
International Search Report and the Written Opinion dated Aug. 17, 2016 From the International Searching Authority Re. Application No. PCT/IL2015/051181.
International Search Report and the Written Opinion dated Apr. 29, 2016 From the International Searching Authority Re. Application No. PCT/IL2015/051180.
International Search Report and the Written Opinion dated Jan. 29, 2016 From the International Searching Authority Re. Application No. PCT/IL2015/050964.
Written Opinion dated Dec. 13, 2016 From the International Preliminary Examining Authority Re. Application No. PCT/IL2015/051181. (10 Pages).
Written Opinion dated Aug. 24, 2016 From the International Preliminary Examining Authority Re. Application No. PCT/IL2015/050964.
Written Opinion dated Oct. 25, 2016 From the International Preliminary Examining Authority Re. Application No. PCT/IL2015/051178. (6 Pages).
Dame et al. "Historical Applications of Induced Sterilization in filed Populations of Mosquitoes", Malaria Journal, 8(Suppl.2/S2): 1-10, Nov. 16, 2009.

(56) References Cited

OTHER PUBLICATIONS

Patterson et al. "The Sterile-Male Technique for Control of Mosquitos: A Field Cage Study With Anopheles Quadrimaculatus", The Florida Entomologist, 51(2): 77-82, Jun. 1968.
Notice of Eligibility for Grant and Examination Report dated Apr. 19, 208 From the Intellectual Property Office of Singapore, IPOS Re. Application No. 11201702171S. (6 Pages).
Examination Report dated Jul. 2, 2018 From the Australian Government, IP Australia Re. Application No. 2015323280. (4 Pages)
Communication Pursuant to Article 94(3) EPC dated Apr. 16, 2018 From the European Patent Office Re. Application No. 15791374.0. (4 Pages).
Notification of Office Action and Search Report Dated Dec. 28, 2018 From the National Intellectual Property Administration of the People's Republic of China Re. Application No. 201580075437.4 and Its Translation Into English. (15 Pages).
Examination Report dated Jan. 22, 2019 From the Republica da Colombia, Superintendencia de Industria y Comercio Re. Application No. NC2017/0006718. (10 Pages).
Notification of Office Action and Search Report dated Nov. 27, 2018 From the State Intellectual Property Office of the People's Republic of China Re. Application No. 201580055946.0 and A Summary of the Notification of Office Action Into English.(6 Pages).
Notice of Acceptance dated Jun. 25, 2019 From the Australian Government, IP Australia Re. Application No. 2015323280. (6 Pages).
Translation Dated Jan. 30, 2019 of Examination Report dated Oct. 22, 2018 From the Republica da Colombia, Superintendencia de Industria y Comercio Re. Application No. NC2017/0006718. (7 Pages).
Translation Dated Jan. 31, 2019 of Notification of Office Action and Search Report dated Nov. 27, 2018 From the State Intellectual Property Office of the People's Republic of China Re. Application No. 201580055946.0. (4 Pages).
Official Action Dated May 15, 2019 From the U.S. Patent and Trademark Office Re. U.S. Appl. No. 15/531,750. (65 pages).
Restriction Official Action Dated May 15, 2019 From the U.S. Patent and Trademark Office Re. U.S. Appl. No. 15/531,498. (8 pages).
Examination Report dated Sep. 3, 2019 From the Republica de Colombia, Superintendencia de Industria y Comercio Re. Application No. NC2017/0006718. (7 Pages).
Notification of Office Action and Search Report dated Jul. 22, 2019 From the State intellectual Property Office of the People's Republic of China Re. Application No. 201580055946.0 and Its Translation Into English.(10 Pages).
Restriction Official Action dated Aug. 23, 2019 From the U.S. Patent and Trademark Office Re. U.S. Appl. No. 15/532, 124. (9 pages).
Search Report and Opinion dated Aug. 21, 2019 From the Servico Publico Federal, Ministerio da Economia, Instituto Nacional da Propriedade Industrial do Brasil Re. Application No. BR112017011678-2 and Its Summary in English. (5 Pages).
Official Action Dated Nov. 26, 2019 From the U.S. Patent and Trademark Office Re. U.S. Appl. No. 15/532,124. (73 pages).
Translation Dated Oct. 17, 2019 of Examination Report dated Sep. 3, 2019 From the Republica de Colombia, Superintendencia de Industria y Comercio Re. Application No. NC2017/0006718. (13 Pages).
Notification of Office Action and Search Report dated Dec. 17, 2019 From the National Intellectual Property Administration of the People's Republic of China Re. Application No. 201580075737.2 and Its Translation of Office Action Into English. (11 Pages).
Communication Pursuant to Article 94(3) EPC Dated Jan. 3, 2020 From the European Patent Office Re. Application No. 15820296.0. (4 Pages).
Examination Report dated Mar. 11, 2020 From the Republica de Colombia, Superintendencia de Industria y Comercio Re. Application No. NC2017/0006718 and Its Translation Into English. (12 Pages).
Official Action Dated Apr. 17, 2020 from the U.S. Patent and Trademark Office Re. U.S. Appl. No. 15/531,498. (83 pages).
Examination Report Under Sections 12 & 13 of the Patents Act, 1970 and the Patents Rules, 2003 Dated Jul. 21, 2020 From the Government of India, Intellectual Property India, Patents, Designs, Trade Marks, Geographical Indications, The Patent Office Re. Application No. 201727012659. (6 Pages).
Final Official Action dated Jan. 19, 2021 from the U.S. Patent and Trademark Office Re. U.S. Appl. No. 15/531,498. (42 pages).
Examination Report dated Sep. 23, 2020 From the Republica de Costa Rica, Registro Nacional, Registro de la Propiedad Intelectual Re. Application No. 2017-0306 and Its Translation Into English. (14 Pages).
Notification of Office Action dated Oct. 14, 2020 From the National Intellectual Property Administration of the People's Republic of China Re. Application No. 201580075737.2 and Its Summary in English. (9 Pages).
Search Report and Explanations dated May 5, 2020 From the Servico Publico Federal, Ministerio da Economia, Instituto Nacional da Propriedade Industrial do Brasil Re. Application No. BR112017005768-9 and Its Summary in English. (5 Pages).
Examination and Search Report dated Sep. 10, 2020 From the Republica de Colombia, Superintendencia de Industria y Comercio Re. Application No. NC2017/0006718. (7 Pages).
Examination Report dated Aug. 25, 2020 From the Instituto Mexicano de la Propiedad Industrial, IMPI, Secretario de Economia, Direccion Divisional de Patentes Re. Application No. MX/a/2017/003733. (6 Pages).
Official Action Dated Sep. 15, 2020 from the U.S. Patent and Trademark Office Re. U.S. Appl. No. 15/532,124. (15 pages).
Translation Dated Sep. 30, 2020 of Examination Report Dated Aug. 25, 2020 From the Instituto Mexicano de la Propiedad Industrial, IMPI, Secretario de Economia, Direccion Divisional de Patentes Re. Application No. MX/a/2017/003733. (5 Pages).
Communication Pursuant to Article 94(3) EPC Dated Oct. 14, 2020 From the European Patent Office Re. Application No. 15820296.0. (5 Pages).
Official Action dated Jun. 4, 2020 from the U.S. Patent and Trademark Office Re. U.S. Appl. No. 15/532,124. (18 pages).
Office Action dated Oct. 6, 2020 From the Israel Patent Office Re. Application No. 252635 and Its Translation Into English. (6 Pages).
Translation dated Oct. 11, 2020 of Examination Report Dated Sep. 10, 2020 From the Republica de Colombia, Superintendencia de Industria y Comercio Re. Application No. NC2017/0006718. (7 Pages).
Examination Report dated Mar. 18, 2021 From the Australian Government, IP Australia Re. Application No. 2015356564. (6 Pages).
Examination Report dated Mar. 22, 2021 From the Australian Government, IP Australia Re. Application No. 2015356566. (5 Pages).
Examination Report Under Sections 12 & 13 of the Patents Act, 1970 and the Patents Rules, 2003 Dated Mar. 18, 2021 From the Government of India, Intellectual Property India, Patents, Designs, Trade Marks, Geographical Indications, The Patent Office Re. Application No. 201727022663. (9 Pages).
Final Official Action dated Feb. 22, 2021 From the U.S. Patent and Trademark Office Re. U.S. Appl. No. 15/532,124. (24 Pages).
Notification of Office Action and dated Feb. 5, 2021 From the State Intellectual Property Office of the People's Republic of China Re. Application No. 201580075737.2 Its Summary Into English. (3 Pages).
Examination Report dated Jul. 23, 2021 From the Republica De Columbial. Superintendencia De Industria Y Comercio Re. Application No. NC2017/0006718. (8 Pages).
Translation dated Aug. 13, 2021 of Examination Report dated Jul. 26, 2021 From the Republica de Colombia, Superintendencia de Industria y Comercio Re. Application No. NC2017/0006718. (17 Pages).

\* cited by examiner

METHOD AND APPARATUS FOR ARTIFICIAL DISTRIBUTION OF INSECTS OR SPRAY

RELATED APPLICATIONS

This application is a National Phase of PCT Patent Application No. PCT/IL2015/050964 having International filing date of Sep. 21, 2015, which claims the benefit of priority under 35 USC § 119(e) of U.S. Provisional Patent Application No. 62/053,242 filed on Sep. 22, 2014. The contents of the above applications are all incorporated by reference as if fully set forth herein in their entirety.

FIELD AND BACKGROUND OF THE INVENTION

The present invention, in some embodiments thereof, relates to a method and apparatus for artificial distribution of material such as insects or spray droplets, and, more particularly, but not exclusively, to the distribution of insects as part of disease control programs, vector control programs, pollination programs and the like.

There are today large regions in the Americas, Africa and Asia that suffer from vector-born diseases transferred by insects, in particular, mosquitoes. The diseases include in particular Dengue fever, and Malaria, which are infectious disease carried and spread by bites from female mosquitoes.

There have been many attempts at a safe and effective means to control vector-born disease, specifically Dengue and Malaria, over sizeable regions, including urban areas by controlling the mosquito population. One method is to release sterile males. The sterile males mate with the females in place of fertile males and in this way prevent reproduction.

A problem with the attempts has been effective distribution of the sterile males. It is not possible to release the insects from aircraft as is done with chemicals and crop dusting, as the airspeeds and wind shear involved generally kill the insects. This is particularly true of mosquitoes which are relatively fragile. Land-based distribution on the other hand is very labour-intensive and it is very difficult and costly to get a reasonable distribution of males, into all of the kinds of places where the mosquitoes congregate. One method that is used involves slow release of sterile males from a cage on a slowly moving vehicle. However this limits the release to areas that have vehicle access, and mosquito distribution pays little regard to vehicle access. A further difficulty is that release is limited to a few hours a day when the mosquitoes are active. Attempting to release mosquitoes at other times is ineffective.

Other difficulties that arise are that point release, meaning releasing at single points, rather than enabling a continuous release, creates a non-homogenous spread of the mosquitoes. Not knowing exactly where the female mosquitoes are, it would be best if a homogenous spread with uniform density is achieved.

Also, when releasing mosquitoes from open cages, it is difficult to control and change the density at which the mosquitoes are released with regard to the level of risk per given area.

The need for aerial release systems is described in the literature. The following are selected quotes:

The Sterile Insect Technique for Controlling Populations of *Aedes albopictus* (Diptera: Culicidae) on Reunion Island Mating Vigour of Sterilized Males states that provided suitable aerial release systems can be developed and the surface of the treated area is large enough, aerial releases would ensure a cost-effective area-wide coverage. The Sterile Insect Technique: can established technology beat malaria?

International Atomic Energy Agency, 2006, stated, "Aerial releases, although never tried with mosquitoes, have a number of potential benefits over ground releases. The release sites can be further away from the facilities, extending the geographical scope of the operation greatly. The need for good ground access to the field sites is no longer valid for daily releases, although for monitoring purposes it would still be desired. In addition, the number of staff required for aerial releases is lower and aerial releases can benefit from existing on-board navigation equipment to accurately release the mosquitoes in the designated areas . . . . However, unlike the robust medfly, mosquitoes are rather fragile creatures. Handling, packing and release methods for mosquitoes need to be developed and tested to assess the impact of aerial release on male behaviour and longevity . . . ".

Historical applications of induced sterilisation in field populations of mosquitoes, David A Dame, Christopher F Curtis, Mark Q Benedict, Alan S Robinson and Bart G J Knols, 2009 states " . . . . Sterile mosquito releases conducted to date have relied on ground release. Relatively simple packaging, transport methodology, release containers and shelters have been devised for pupal and adult releases, but no work has been initiated on methods of aerial distribution. Certainly, in urban programmes ground release might suffice, but the availability of satisfactory aerial release methods could provide timelier and more effective distribution with reduced opportunity for pre-release damage to the sterile males. Production and release of millions per day will demand expedited delivery mechanisms to prevent losses in quality and competitiveness".

At the present time there are two basic systems for aerial release of insects. These are the bag release and chilled fly release systems. However these tend to be used for relatively hardy insects such as fruit flies and are less useful for mosquitoes which are relatively fragile.

The bag release is a relatively simple process in which flies emerge from within sealed paper bags which are ripped open and then dropped out of the aircraft. For example the bags may be ripped open manually and thrown out of the window, or can be thrown down an exit chute, coming into contact with hooks or knives located at the end of the chute upon exiting the aircraft.

The resulting litter generally biodegrades, but is not environment-friendly in dry climates where the degradation process is slow.

The paper bags serve to increase the surface area within the container thereby reducing competition for space between the enclosed individuals.

The flies generally remain in the bags until reaching the ground, and then emerge out of the tear, at this point being exposed to the risk of being eaten by predators.

The chilled adult release system works as follows. At the release center the insects are placed into room-size refrigerators and chilled to 4° C. until they fall down to the bottom of PARC boxes in a phase known as the knockdown phase. The chilled insects are then collected into a chill-box which is carried to the release airplane, a box holding as many as five million sterile insects. Once in the plane, the box is attached to a cooler that keeps the insects motionless during the release period, also making the flies less active, achieving a more even distribution into the environment. The flies drop from the bottom of the chill-box into an auger system, which moves them through a chute located on the underside of the airplane fuselage. The release rate, of insects per unit area, can be controlled via the revolution speed of the auger system. Insect mortality in this system is negligible and dispersal is satisfactory, however the system is only suitable for flies, which are relatively robust insects, and, as mentioned, cannot be used on the more fragile insects such as mosquitoes.

U.S. Pat. No. 7,131,600 discloses an atomization chamber apparatus used for aircraft pesticide delivery, which has an open ended walled chamber, divided into left and right sections, each having outer and inner segments, each segment having a top and a bottom wall, the outer segments having a concave upper wall and a convex lower wall, while the inner segments have a convex upper wall and a concave lower wall. A nozzle injector connectable to a fluid pesticide source is laterally disposed in an inner segment. The nozzle is chosen such that exiting pesticide will not impact the chamber walls, and the radii of the segments are chosen such that the speed of pesticide atomization by the incoming air is slowed down to reduce fines upon pesticide impact, and the speed of the pesticide air mixture on exiting the chamber is increased to substantially match the airspeed of the aircraft.

SUMMARY OF THE INVENTION

The present embodiments may involve setting up a transition volume of gradually changing air velocity between the aircraft and the ambient air so that the material to be distributed, for example spray droplets or insects, are not exposed to violent wind shears the moment they exit the aircraft. One way of achieving such a transition volume is to release the material using a slight overpressure, from within an aerofoil shape placed within a nozzle structure. The nozzle structure may be a longitudinal nozzle structure extending as a winglet behind the aircraft wing and covering multiple insect outlet pipes.

According to an aspect of some embodiments of the present invention there is provided a diffuser for distributing material, such as spray droplets or insects, from an aircraft, the diffuser being mounted on an aircraft and comprising:

at least one distribution tube connected to an insect source at a first end and open to the outside at a second end for distribution of the insects etc;

a nozzle surrounding the second end;

and a tube cover surrounding the second end within the nozzle, the tube cover having aerofoil-shaped cross section.

In an embodiment, the nozzle comprises a subsonic two-dimensional converging-diverging nozzle.

In an embodiment, the nozzle comprises a bi-cubic polynomial internal contour.

In an embodiment, the nozzle comprises an elliptical external shape.

In an embodiment, the aerofoil shape is an NACA standard shape.

In an embodiment, the NACA standard shape is an NACA 0018 standard shape.

In an embodiment, the tube cover is positioned within the nozzle such that a smooth external contour of the standard shape limits flow separation to the near wake of the blunt trailing edge section of the nozzle.

In an embodiment, the insect source is provided with an overpressure.

In an embodiment, the overpressure is such as to provide an air velocity exiting the tube at the second end of substantially 1 m/s (one meter per second).

In an embodiment, the nozzle is cubic.

In an embodiment, the insect source is provided with an overpressure and the overpressure is such as to provide an air velocity exiting the tube at the second end of substantially 1 m/s.

The diffuser may be mounted on an aircraft wing.

In an embodiment, the insects being distributed comprise relatively fragile insects being unable to bear a wind shear in excess of 60 km/h.

In an embodiment, the insects being distributed comprise male insects, and more particularly, the male insects may be male mosquitoes, for example sterile male mosquitoes. Alternatively they can be fruit flies or any other insect.

According to a second aspect of the present invention there is provided a diffuser for distributing material, such as spray droplets or insects, from an aircraft, the diffuser being mounted on an aircraft and comprising:

at least one distribution tube having an opening providing air at a speed of at least 1 m/s;

a nozzle surrounding the opening;

and a tube cover surrounding the second end within the nozzle, the tube cover having a wing-shaped cross section.

According to a third aspect of the present invention there is provided an air transition volume between an aircraft flying in excess of stall speed and ambient air, the transition region comprising:

a first volume immediately behind an opening of a tube, shielded by a wing-shaped tube cover and surrounded by a nozzle, defined by an airspeed of air exiting the opening at a velocity of at least 1 m/s less than a speed of the aircraft;

successive volumes receding from the first area of successively reduced speeds, eventually merging into the ambient air, the transition volume being characterized by a maximum wind shear over any cubic centimeter volume within the air transition volume being less than 60 km/h.

According to a fourth aspect of the present invention there is provided a method of distributing insects or spray droplets from an aircraft, comprising:

setting up an air transition volume between a speed of the aircraft and a speed of ambient air, the aircraft flying in excess of a respective aircraft stall speed, the air transition volume being such that a maximum wind shear over any cubic centimeter volume within the air transition volume is less than 60 km/h;

using overpressure to push the spray or insects out of a source into a tube;

terminating the tube outside the aircraft into the air transition volume;

and allowing the material to exit the tube into the air transition volume.

According to a fifth aspect of the present invention there is provided a method of distributing insects from an aircraft, comprising:

pushing insects out of an insect source into a tube;

terminating the tube at an opening outside the aircraft; and using overpressure in the tube to expel the insects from the opening.

According to a sixth aspect of the present invention there is provided a diffuser for distributing insects from an aircraft, the diffuser being mounted on an aircraft and comprising:

at least one distribution tube connected to an insect source at a first end and open to the outside at a second end for distribution of the insects; and a nozzle surrounding the second end.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified illustration of the contours of a bi-cubic nozzle for insect distribution according to a first embodiment of the present invention;

FIG. 2 is a simplified diagram showing the aerofoil shape of the tube cover according to an embodiment of the present invention;

FIG. 3 is a simplified diagram showing simulated air velocities resulting from the aerofoil shape of FIG. 2;

FIG. 4 is a simplified diagram a substantially linear nozzle shape according to an embodiment of the present invention;

FIG. 5 is a simplified diagram showing simulated air velocities resulting from the nozzle shape of FIG. 4;

FIG. 6 is a simplified diagram showing a bi-cubic nozzle shape according to an embodiment of the present invention;

FIG. 7 is a simplified diagram showing simulated air velocities resulting from the nozzle shape of FIG. 6;

FIG. 8 is a simplified diagram showing simulated air velocities using a wide cubic nozzle shape according to an embodiment of the present invention;

FIG. 9 is a simplified diagram showing another bi-cubic nozzle according to an embodiment of the present invention, with an extended exit area;

FIG. 10 is simplified diagram showing simulated air velocities resulting from the nozzle shape of FIG. 9;

Figure 1:
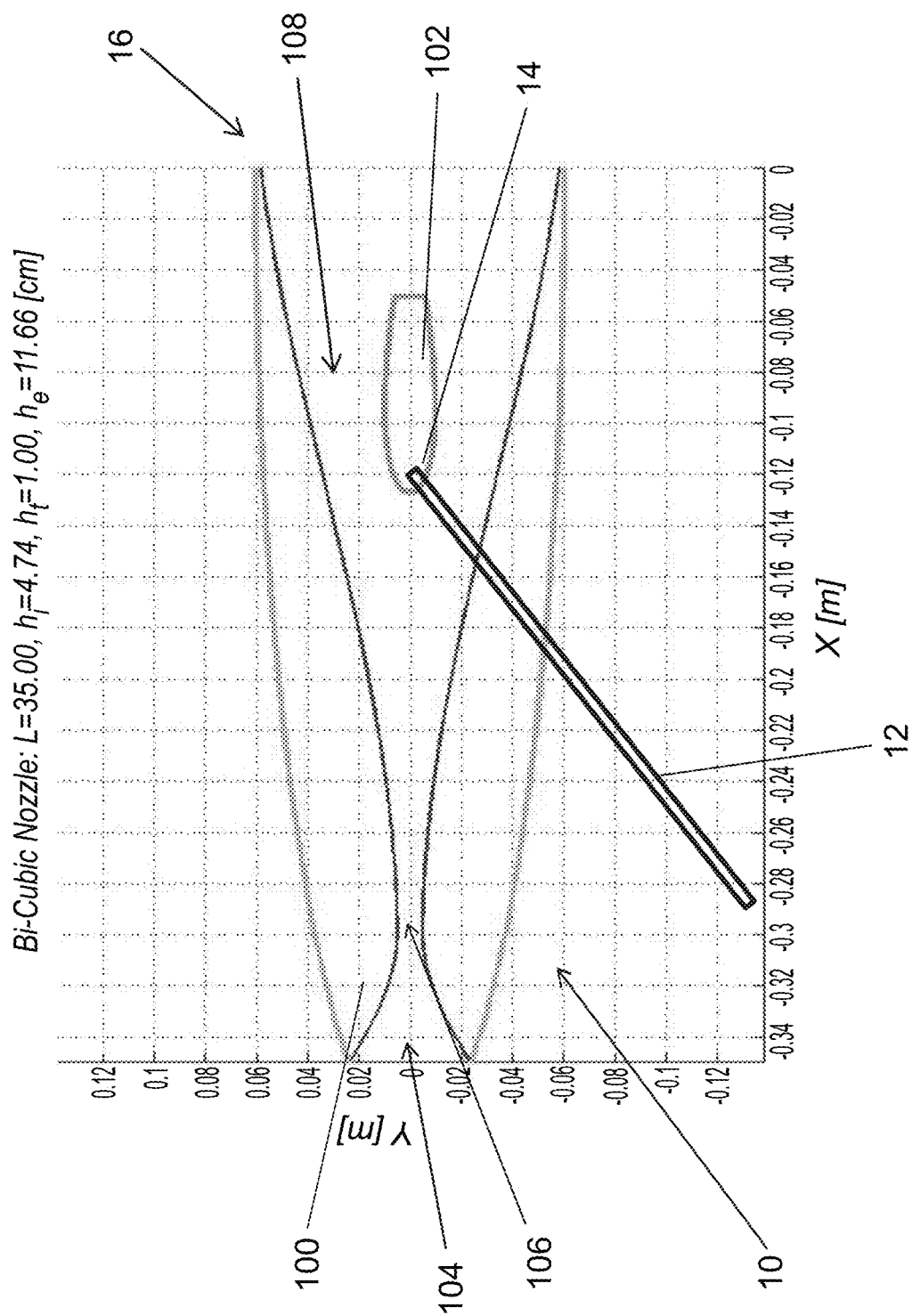
Figure 9:
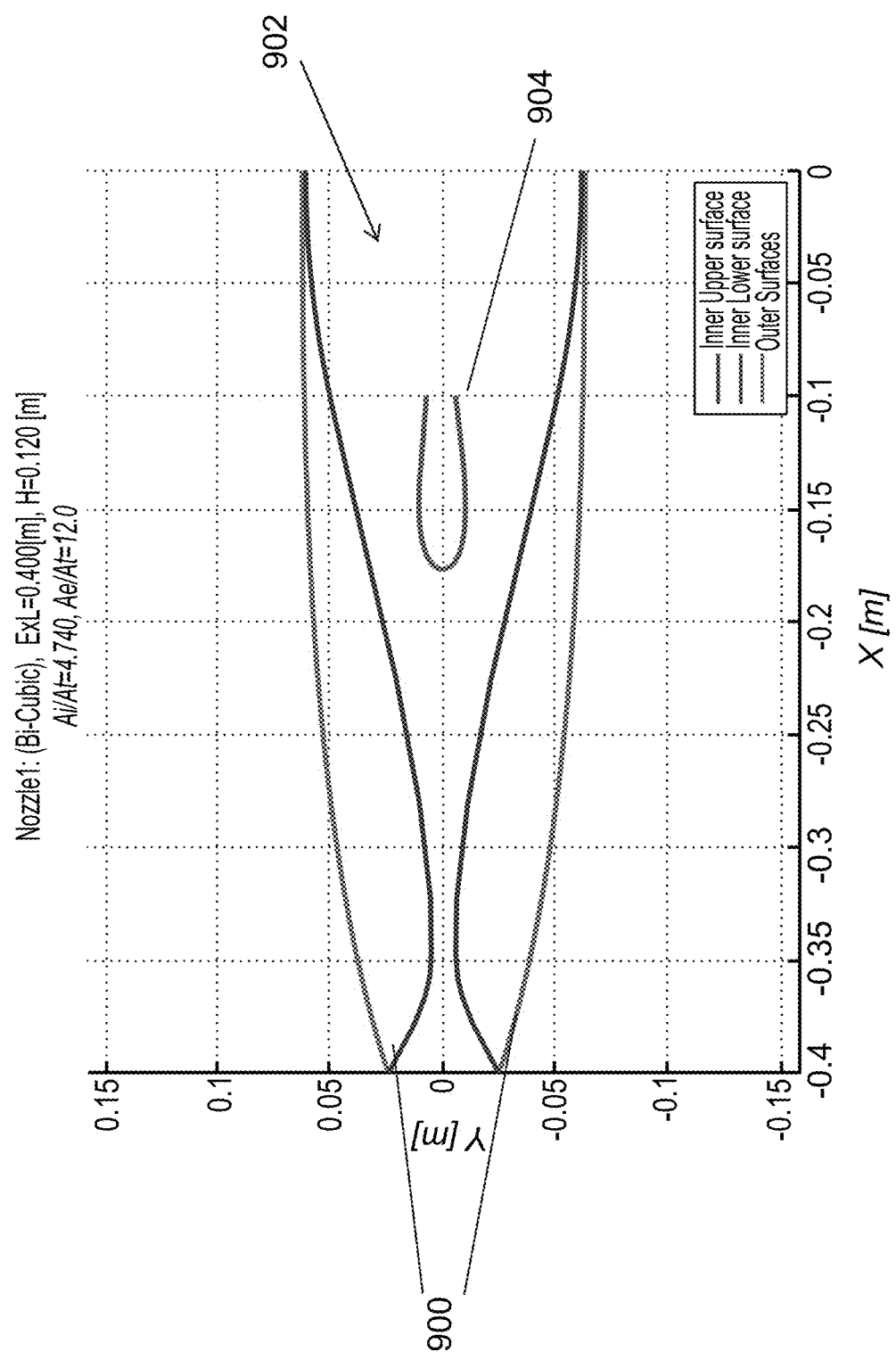
Figure 11:
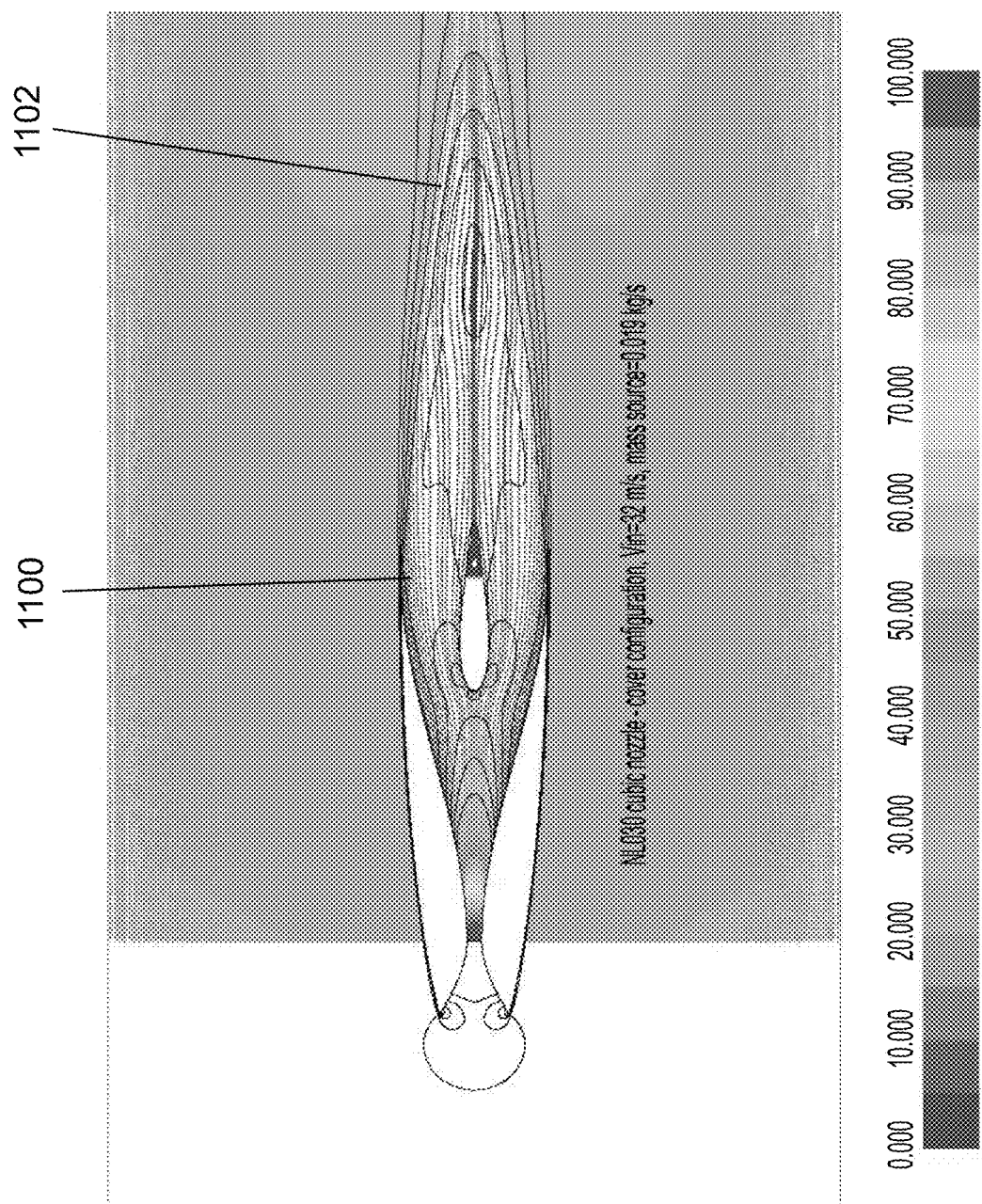
Figure 12:
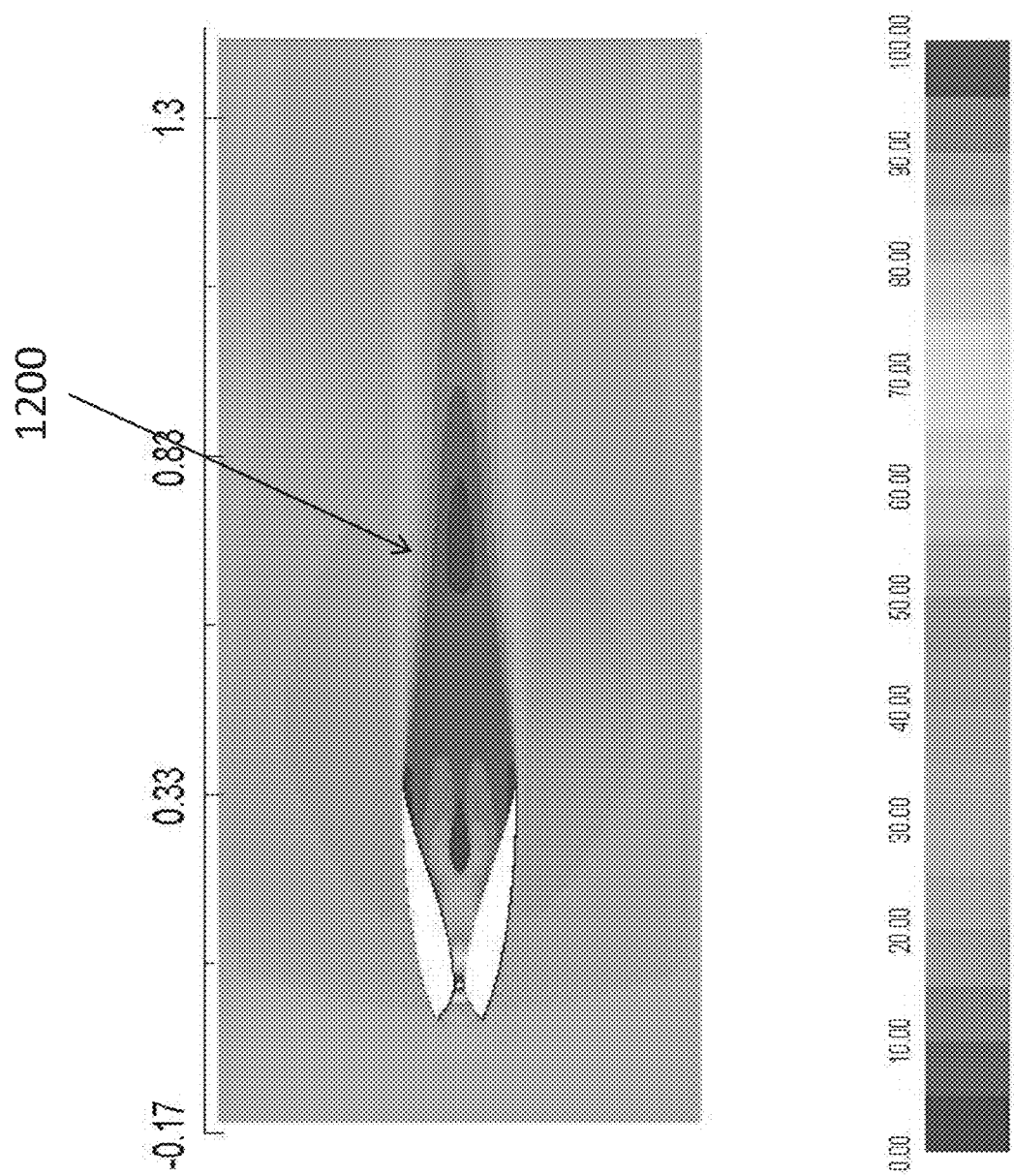
Figure 13:
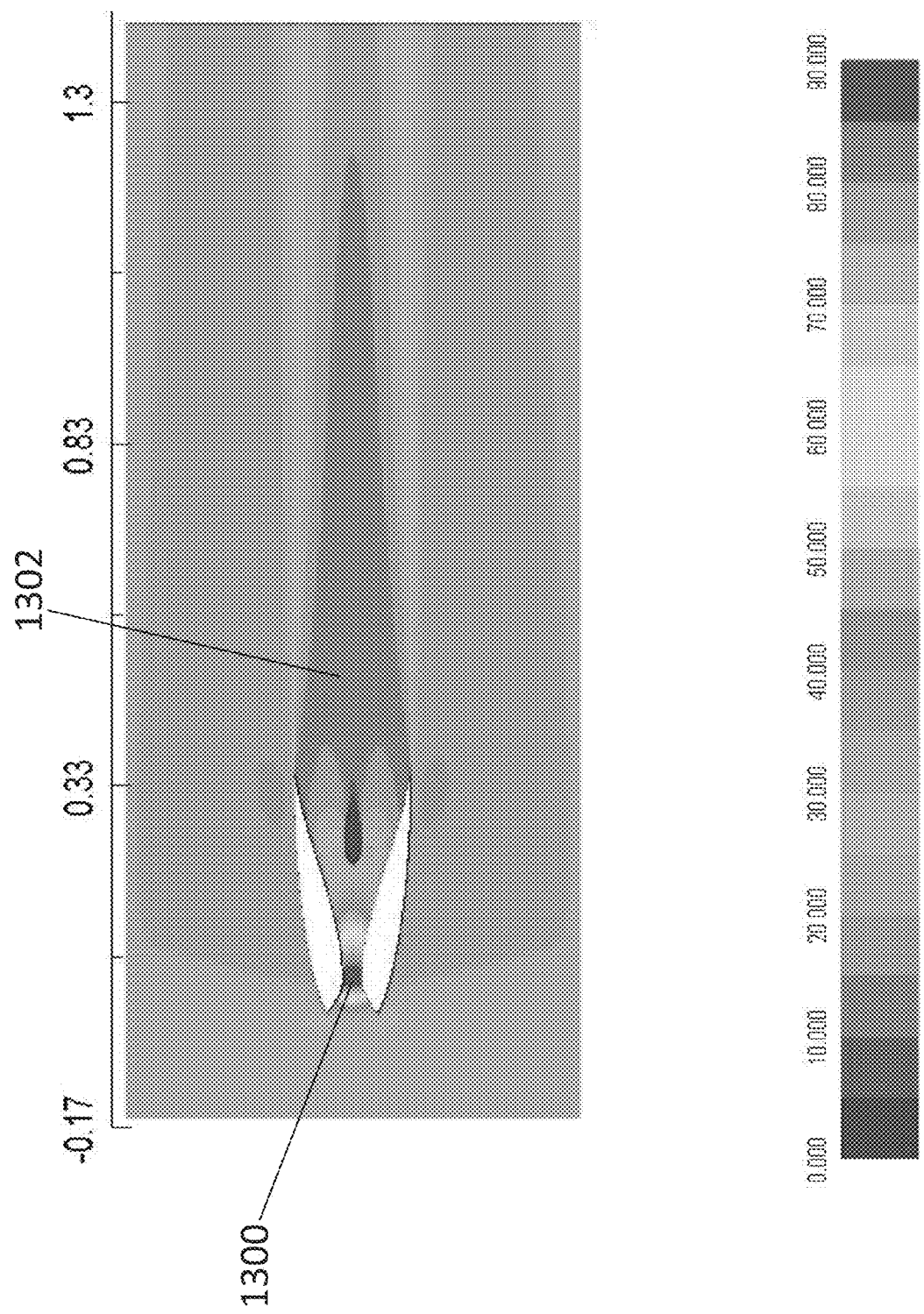
Figure 14:
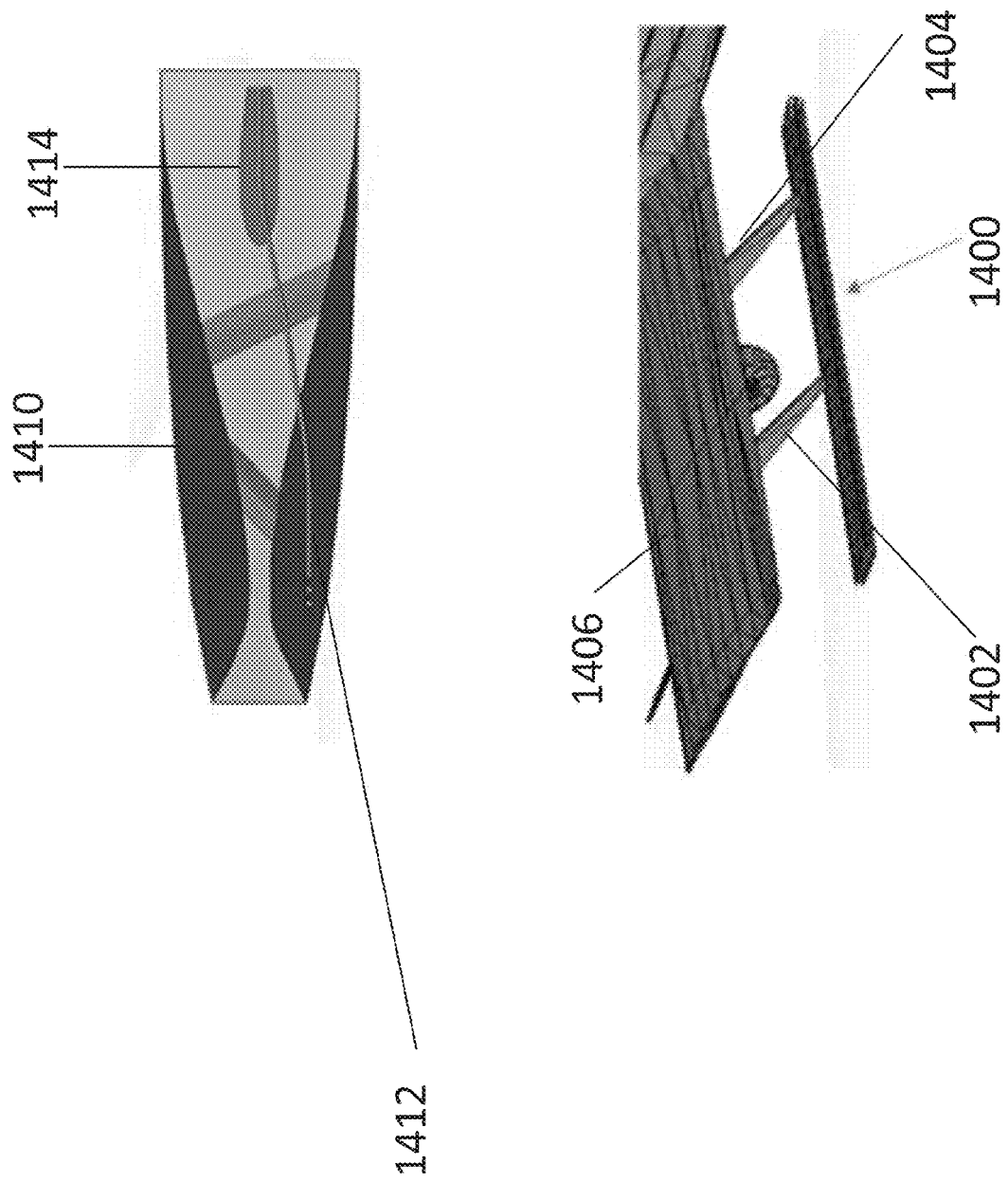

FIG. 11 simplified diagram showing simulated air velocities resulting from the nozzle shape of FIG. 9 when air exits the insect delivery tube at a velocity of around 1 m/s;

FIG. 12 is a simplified diagram showing air flow velocities resulting from the nozzle shape of FIG. 1 when air exits the insect delivery tube at a velocity of around 1 m/s;

FIG. 13 is a simplified diagram showing air flow velocities resulting from a variation of the nozzle shape of FIG. 1 wherein the throat of the nozzle is widened, and when air exits the insect delivery tube at a velocity of around 1 m/s; and FIG. 14 is a simplified diagram and cross-section of the dispenser of the present invention attached to an aircraft wing.

DESCRIPTION OF SPECIFIC EMBODIMENTS OF THE INVENTION

The present invention, in some embodiments thereof, relates to a method and apparatus for artificial distribution of material such as insects and, more particularly, but not exclusively, to the distribution of insects as part of disease control programs, pollination programs and the like, or to distribution of sprays in general.

A diffuser for distributing material from an aircraft, is mounted on an aircraft and comprises a distribution tube connected to an insect source at a first end and open to the outside at a second end for distribution of the insects. A nozzle surrounds the second end and a tube cover surrounds the second end within the nozzle, the tube cover having an aerofoil, or wing-shaped, cross section. The nozzle shape and aerofoil combination sets up an air transition volume between the aircraft and ambient air and within the transition volume there is a maximum wind shear over any cubic centimeter volume which is less than 60 km/h and between 36 and 54 km/h, for an airplane speed of ~120 km/hr, therefore allowing distribution of the material from the aircraft without damage.

Herein the term "aircraft" refers to any airborne craft and includes conventional aeroplanes, as well as unmanned aerial vehicles, helicopters, gliders, and lighter-than-air craft.

Herein the term diffuser is used to mean an attachment or duct for broadening an airflow and reducing its speed. The material, for example mosquitoes, is injected into the diffuser for safe distribution.

As discussed in the background, mosquitoes are a particularly fragile kind of insect which cannot be distributed by conventional air dispersion. The transition volume allows mosquitoes to be safely distributed.

In an alternative embodiment, the material may be a spray. Different sprays have different ideal droplet sizes. A phenomenon with aerial spraying is that the sudden transition to high windspeed causes a small drop size, so that aerial spraying with a large drop size has hitherto been a technical challenge. The present embodiments, which provide a transition air volume, cushion the spray from a sudden exposure to a high wind velocity and thus allow a relatively large droplet size with aerial delivery.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a diffuser 10 for distributing insects from an aircraft. The diffuser may be mounted on an aircraft, in particular under and slightly behind an aircraft wing as shown in FIG. 12 hereinbelow. The diffuser comprises one or more distribution tubes 12 which are connected to an insect source at a first end (not shown) typically within the aircraft and open to the outside at a second end 14 for distribution of the insects.

A nozzle 100 surrounds the end of the tube, and a tube cover 102 surrounds the second end inside the nozzle. The tube cover has an aerofoil or wing-shaped cross section.

Nozzle 100 may be a subsonic two-dimensional converging-diverging nozzle, and may comprise a bi-cubic polynomial internal contour.

The nozzle 100 may further comprise an elliptical external shape. The nozzle may be elongated to extend along the length of the wing, as shown in FIG. 12, so as to cater for multiple outlet tubes 12. Alternatively, the nozzle can be round and cater for a single tube 12.

The wing or aerofoil shape may be an NACA standard shape, for example the NACA 0018 standard shape.

The tube cover 102 is positioned within the nozzle at a location selected such that the smooth external contour of the standard shape limits flow separation that would otherwise occur in such a nozzle to the near wake of the blunt trailing edge section 16 of the nozzle.

The insect source may be provided with an overpressure, so as to provide an air velocity exiting the tube of substantially 1 m/s. The nozzle 100 may use a range of cubic shapes for its internal surface, as will be discussed below, and is not limited to the bi-cubic shape shown.

The insects may comprise relatively fragile insects where fragile is defined as being unable bear a wind shear in excess of 60 km/h and more particularly in the range of 36-54 km/h. In particular, experimental results show that releasing into an airspeed of 10-15 m/s does not kill the mosquitoes. This is equivalent to 36-54 km/hr. Once outside the airspeed gradually falls until reaching the same speed as the outside air.

The expectation is that most of the insects will survive. The diffuser is not limited to distribution of fragile insects, although it is designed to cater for fragile insects. Any insects may usefully be distributed thereby as desired. The insects being distributed may be any insects but the diffuser is particularly useful for distribution of male insects engineered for disease vector eradication programs, for example, sterile male mosquitoes or genetically modified mosquitoes.

In addition to insects, the nozzles of the present embodiments may be used for sprays, as mentioned.

The nozzle may set up an air transition volume between the aircraft flying in excess of stall speed and ambient air. An air transition volume is shown for example in FIG. 11 hereinbelow. The air transition volume may ensure a relatively gradual transition between the two air speeds, namely of the aircraft and the ambient air, which allows even relatively fragile insects to survive the distribution operation. A first volume of the air immediately behind an opening of the distribution tube 12 is shielded by the aerofoil, or wing-shaped, tube cover 102 and surrounded by nozzle 100 as explained. The transition volume has a first part, immediately behind the tube opening, which is defined by an airspeed of air exiting the opening at a velocity of about 1 m/s less than the aircraft speed. That is to say, given that the aircraft is moving and the air is assumed to be static, then the 1 m/s ejection speed is a reduction in speed. Then successive volumes of the air receding backwards and radially outwardly from the first area, have successively reduced speeds, eventually merging into the ambient air. The gradual transition may be characterized by a maximum wind shear experienced by the mosquitoes as they are expelled into the air transition volume being less than 60 km/h and in an example less than 25 km/h.

Thus the insects may be distributed from the aircraft by setting up the air transition volume as described above, using overpressure to push insects out of an insect source into tube 12, terminating the tube outside the aircraft into the air transition volume, and allowing the insects to exit the tube into the air transition volume.

As mentioned above, the air transition volume is also useful in the case of sprays, as sudden exposure to a large air speed has the effect of breaking up droplets. The air transition volume by contrast allows for larger droplets.

Larger droplets equate with less drift, so that the droplets fall closer to their release points. This is particularly important with toxic materials, with expensive materials, and with farmers whose neighbors might be using organic methods, and also reduces waste. Also a larger droplet covers the plant or ground on which it lands with more material.

Considered in greater detail there is provided a device to release mosquitoes and like fragile insects from an aircraft using a diffuser/pod like configuration with openings on both sides and an injection unit within.

The flow within the 2D diffuser may be controlled by its geometry, dimensions and location, which together act as a controller for the flow along the diffuser and prevent flow separation. Additional control may be provided by blowing air outside of the inner element, that is through the cover tubes.

In order to prevent the impact of air velocity on the insects during their release from the airplane, the present embodiments may lower the exit velocity difference compared to the immediately surrounding air, and have the actual velocity of the insects gradually increase prior to exposure to the environmental air surrounding the aircraft.

More specifically, while the airplane is flying at a speed greater than 110 km/hr, the embodiments allow the mosquitoes to experience only some 25-60 km/hr wind shear during their exit, and to gradually be introduced to the stationary surrounding air.

The idea is that at no point during the transition should the insects experience anything more than the 25-60 km/hr wind shear, thus allowing for safe and effective distribution from the air without damage. A preferred initial air speed within the volume is around 10 m/s which is 36 km/hr, and afterwards, the flow gradually increases. It is noted that the above speeds are correct for an aircraft travelling at 120 km/h, which is typical for a small agricultural plane. If the aircraft were to fly faster than the wind shear would increase, which may still be useful for applications such as distribution of fruit flies or for chemical spraying. If used for chemical spraying then atomizers may be added. Also if the diffuser is to be used with larger aircraft having higher stall speeds then the geometry of the diffuser may be modified accordingly.

Diffusers as such are well known and exist in the market for many applications, although they have never been used or suggested for distributing insects. At the exit of a diffuser, the velocity is lower than at the entrance, however, if needed to further decrease the velocity two options exist:

- Increasing the length of the diffuser. This is not possible in the present case since it would lead to a length which is too large, a big, heavy system causing considerable drag to the airplane. The result would be expensive, in particular requiring the use of a large plane.
- If keeping to the same dimensions, it is possible to increase the angle of curvature, thus increasing the area and particularly the height between the upper and lower diffuser tips. However if the angle of curvature is more than 6-7 degrees, then flow separation starts to appear—the speed slows as the area increases, and airflow trying to move from the low pressure area to the high pressure area starts to separate. This effect may cause harm to the fragile insects.

The present embodiments may solve the wind speed problem by managing the airflow using an additional element, hereinafter referred to as a tube cover, within the diffuser.

The tube cover 102 may actually control the vertical extent of the region of slow moving air around the exit of the diffuser, and thus prevent flow separation. The use of the tube cover 102 thus provides a small dimension element, but with low exit velocity. With the tube cover alone, the velocity at the exit is very small which is helpful for the just released insects, but the area within which the velocity is low is in itself very small, and essentially defined by the height of the tube cover.

Now the role of the diffuser together with the tube cover is to increase the region of the low velocity, and in particular its length, thus allowing the air velocity to gradually increase towards a match with the surrounding air.

Conventionally, for applications using diffusers, the design goal is to provide a flow which is as uniform as possible. Putting the tube cover inside prevents the flow from being uniform. In the present case, the goal is a velocity difference from the exit point to the ambient air which is low enough at all points for releasing of insects, so the uniformity of the flow is less important.

The present embodiments may thus provide control of the airflow and prevent separation of airflow regions inside a small dimension 2D diffuser with a curvature of more than 6-7 degrees, by introducing a central element which can control the flow along the diffuser sides.

Parameters associated with the tube cover are:
1. Location inside the diffuser
2. Dimensions
3. Geometry
4. Internal velocity of airflow exiting the diffuser and carrying the insects. The blown air eliminates some undesirable effects, as discussed in greater detail below, and can help achieve a more uniform flow within the device.

In contrast with the prior art chilled release box, the present embodiments push out the insects with air blow and positive air pressure, rather than suck out the insects with negative pressure.

The present embodiments may provide a small dimension diffuser with no flow separation, creating a volume with gradual velocity differences, such that velocity gradually increases at the exit point until it matches the external air flow. The result is the release of fragile insects at low relative air velocity.

As mentioned, the present embodiments relate to the search for a safe and efficient method to control vector-borne diseases, specifically Dengue fever and Malaria, over sizeable regions, including urban area. The preferred method is to use engineered sterile male mosquito to mate preferentially with females and disrupt fertility, thus disrupting continuity of the *Anopheles, Aedes Aegypti* and other types of mosquitoes which are the carriers of the disease.

In order to achieve fast and even cover over large areas, including places that are hard to get to, aerial operation is suggested, as discussed above. The general idea is to propose a sub-system that is as close as possible to existing aerial crop dusting techniques so as to work on the same equipment with minimal conversion.

The presently provided mosquito delivery sub-system (MDSS) embodiments may be fitted to typical agricultural crop-dusting aircraft. In particular, the present study used the Brazilian, Embraer EMB-202 Ipanema agricultural aircraft with standard petrol engine as the 'test-bed'. Generally, agricultural aircraft come in low wing and high wing variants, and the geometry of the present embodiments may be modified so that for aircraft with high-wing, an axi-symmetric version of the diffuser is provided.

The presently described approach may use storage containers stored inside the fuselage of the aircraft. The containers may be kept at slight over-pressure. The MDSS (mosquito delivery sub-system) may conveniently be attached to the aircraft beneath and slightly beyond the wing. The delivery ports are evenly distributed along the span of the MDSS.

A design objective of the MDSS is to minimize the added drag to the aircraft, as well as to ensure comfortable initial conditions for the mosquitoes during delivery.

In the following, it is assumed that the working flight speed, which should be as high as possible, can be taken to be nominally 20% higher that the stall-speed of the aircraft.

In the following it is further assumed that the mosquitoes require to be released into a relatively low speed air environment of the order of 10 m/s.

As previously mentioned, the storage containers are located in the fuselage, and tubes or chutes allow a smooth transfer of the mosquitoes from the storage tanks to the tube outlets at particular delivery spots. The Tubes are packaged together within an elongated nozzle and covered by an aerodynamic smooth cover, which may for example be similar to a standard NACA-0018 airfoil section. Each one of the tubes ends at a specific delivery port. The smooth contoured cover, denoted herein as the tube-cover, is embraced by two nozzle segments, upper and lower, of a subsonic diffuser. Part of the flight airstream enters the diffuser. The local velocity of the air inside the diffuser increases through the converging part of the diffuser, and reaches a maximum at the throat. Further downstream, the local velocity decreases as the segments diverge and the height of the diffuser increases. Into the low velocity region the mosquitoes are released with a small ejection velocity $V_{eject}$ of the order of $V_{eject} \sim 1.0$ [m/s]. The specific delivery point is in the shadow or wake of the Tube Cover. In the immediate neighborhood of the mosquito delivery point, local air velocities are lower than V=10÷15 [m/s]. In other words there are regions that enables safe exit of the mosquitoes.

The main geometrical parameters controlling the low speed air and its extent have been defined as:
1) The overall diffuser length
2) The diffuser throat height
3) The diffuser exit height
4) Functional shape of the diffuser inner contours
5) Relative location of the tube cover inside the diffuser.

A mathematical analysis has been based on high fidelity solutions of two-dimensional (2D), incompressible air flow around a delivery mechanism that is attached to the wing of agricultural airplanes. The numerical simulations use the full Reynolds Averaged Navier-Stokes (RANS) system of equations with two equation (k–ε) turbulence model. The solution uses finite volume discretization and the algorithm is second order.

Within the above mentioned design parameters, the shape of the "mosquito delivery sub-system" (MDSS) was optimized requiring a blend of: a) maximum size of low speed area, b) minimum MDSS drag.

A preferred MDSS configuration is presented in FIG. 1. As discussed above, FIG. 1 shows a subsonic two-dimensional converging-diverging nozzle 100 with a bi-cubic polynomial internal contour and a slightly modified elliptical external shape.

Tube cover 102 has a wing-shaped cross section as discussed above and shields the pipes from which the mosquitoes are released. The nozzle has a region 104 of reducing cross-section and increasing air velocity, a throat 106 and a region 108 downstream of the throat of steadily increasing cross-section and reduced air velocity.

As far as the present inventors are aware, the embodiments provide a novel approaches in several aspects. First, in dealing with live mosquitoes, flow conditions may be constrained in ways that are not well defined, in the sense that requirements like "suitable flow conditions for mosquitoes" do not specify the extent of the low speed region, nor do they define permissible velocity gradients. Second, it is well known that subsonic flow is decelerated by increasing nozzle cross section. However, if the diffuser's area increases too fast (more than about 7°) flow separation can be expected. In this case a severe drag increase is expected and the flow becomes unsteady. In the present design, the inner tube-cover serves to control the rate of flow deceleration and thus suppress flow separation. Moreover, the actual longitudinal location of the tube-cover along the diffuser may be set to optimize local flow conditions at the mosquito-delivery-ports. The use of an aerofoil element to reduce the air velocity sufficiently in the vicinity of mosquito-delivery-ports has not been attempted previously to the best of the inventors' knowledge.

The tube cover is now considered in greater detail. The tube cover may be provided as a fixed component, or may be removable to be attached for each flight or as needed.

The tube cover may have an aerofoil cross section, that is it may have a shape defined by a wing-like cross section, which shape provides less drag than for example having a pipe with a circular cross section.

As well as suppressing flow separation, the tube cover further may further serve to release the insects at the center of the diffuser, where the velocity is low. If, without the tube cover, one simply takes a pipe and releases the insects at the sides of the diffuser, the air velocity to which they are instantly exposed is high. A solution is to extend the pipe towards the center and then cover it with the tube cover to reduce drag.

Within the tube cover, inside and along the length of the diffuser, each one of the tubes ends at a specific port. The mosquitoes travel along different tubes and do not need to encounter junctions.

The main geometrical parameters controlling the low speed air and its extent have been defined as:
1) Diffuser length
2) Diffuser throat height
3) Diffuser exit height
4) Functional shape of the diffuser inner contours
5) Relative location of the tube cover and the diffuser The following provides examples of different configurations, showing how tube cover and nozzle parameters, such as geometry, dimensions, and location within the diffuser can have effects on the performance of the diffuser and the effective distribution of the mosquitoes.

Figure 2:
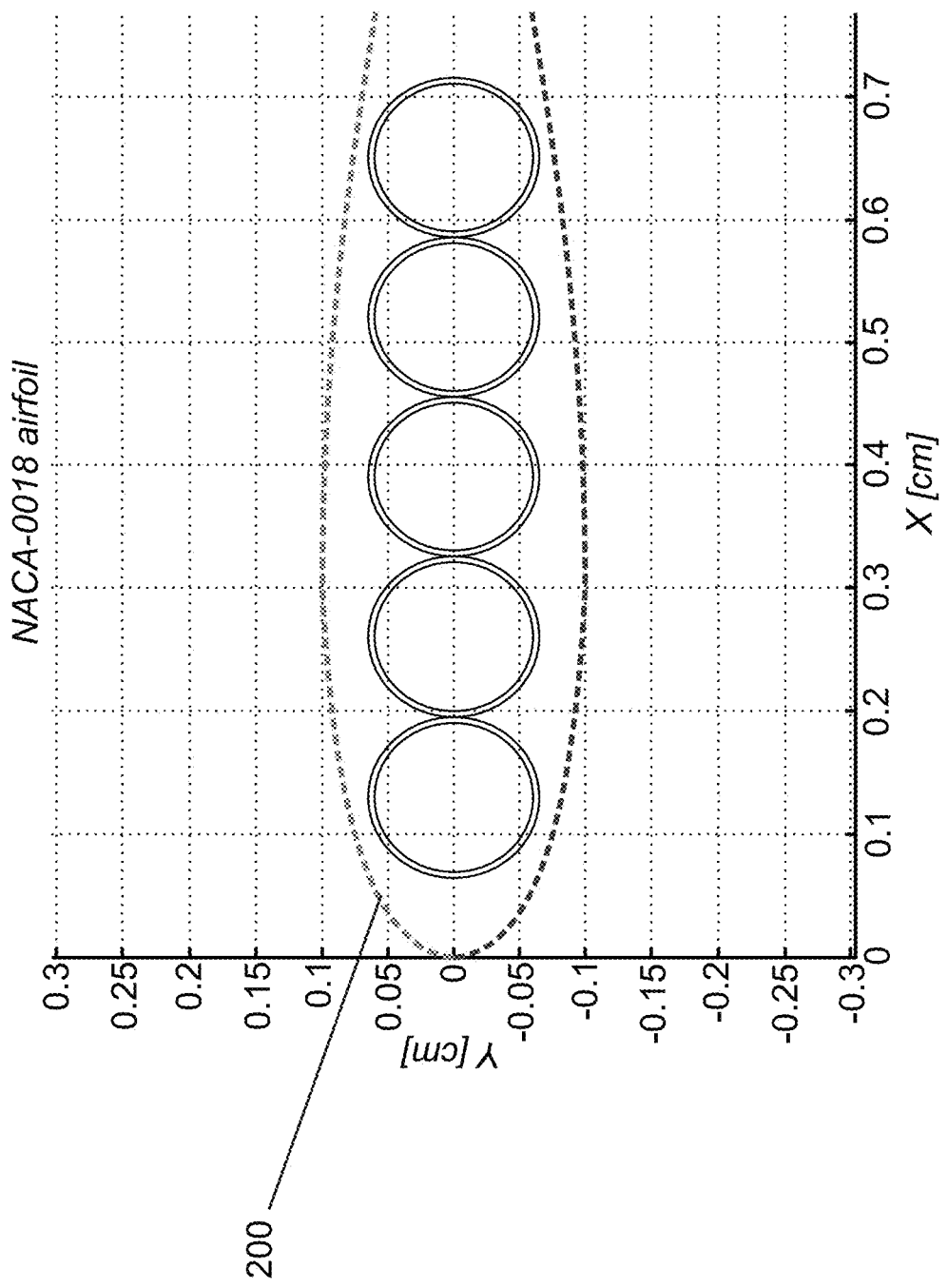
Figure 3:
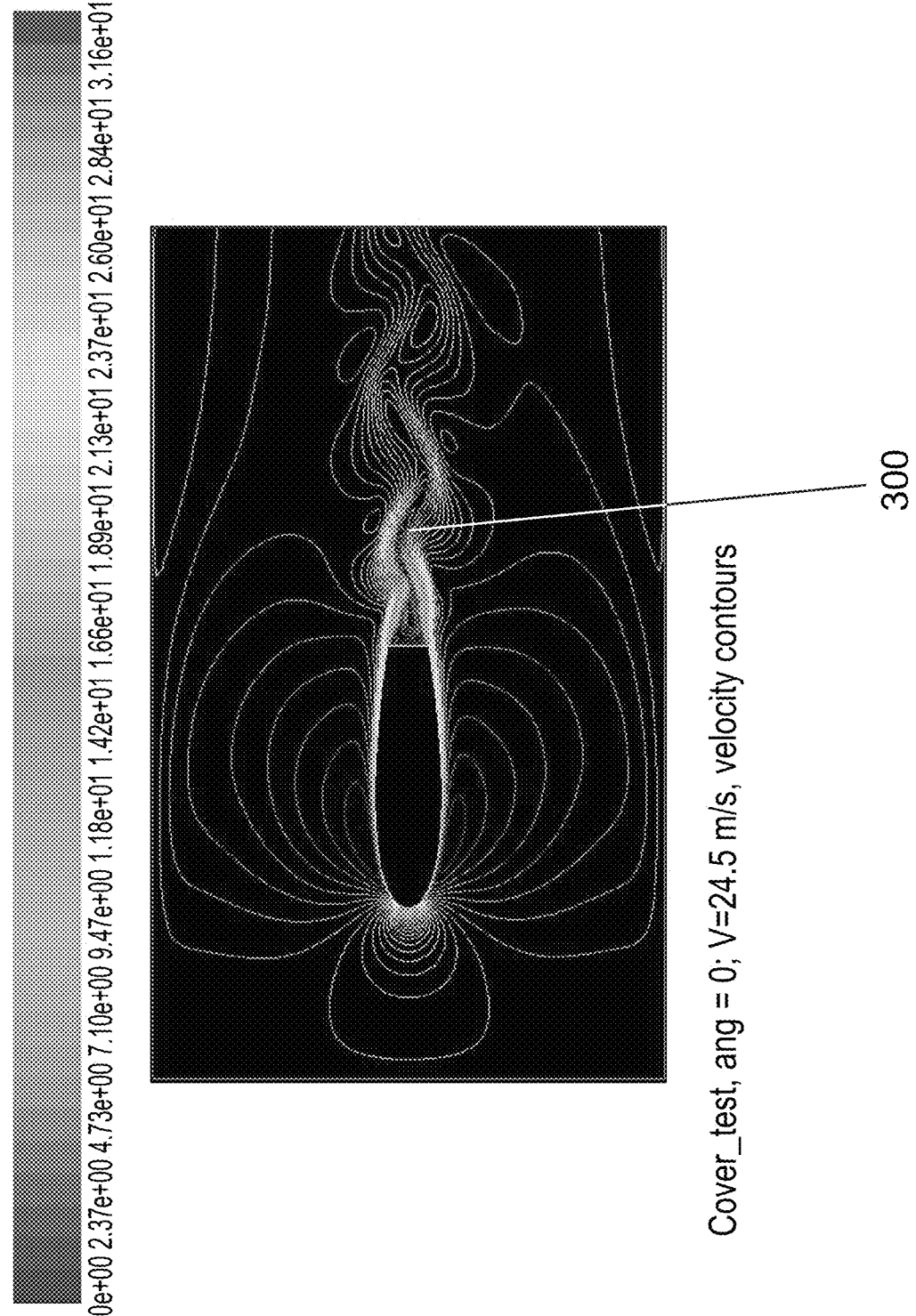

Reference is now made to FIG. 2 which illustrates the tube cover 200 taken alone. FIG. 3 shows the corresponding air flow.

As explained above the NACA-0018 standard shape is used. Due to the smooth external contour of this shape, flow separation is obtained only in the near wake of the blunt trailing edge section—16 in FIG. 1. The air flow analysis in FIG. 3 shows a small region of low velocity 300 at the exit of the tube. The area is too small to be useful for distributing mosquitoes.

Despite the success in obtaining a considerable reduction in the wake velocities trailing the tube cover alone, the tube cover solution by itself is not sufficient, due to the restricted region of low speed. The relevant low velocity region is of a few centimeters in length. As a result, the changes in the velocity are too large for the fragile insects.

Figure 4:
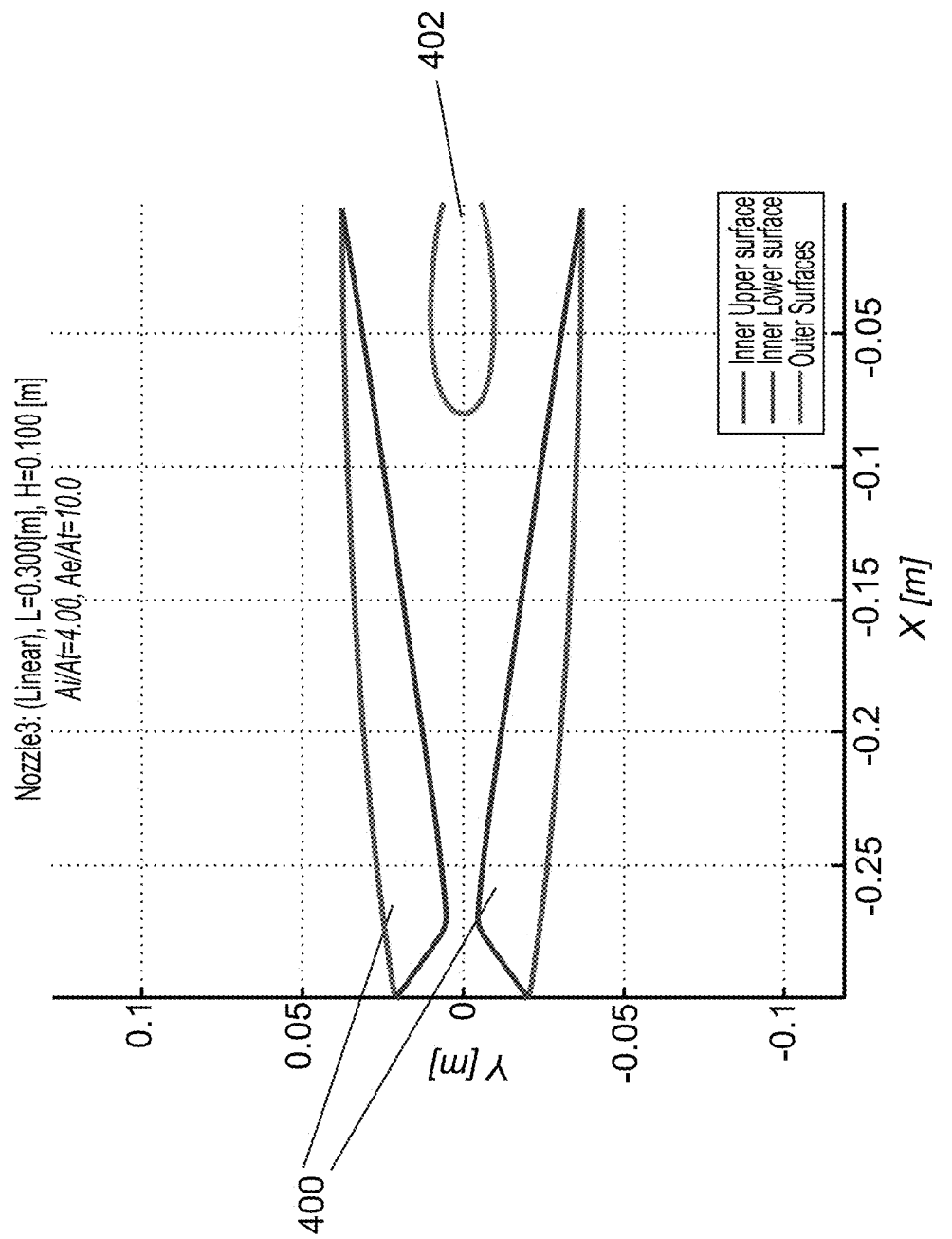
Figure 5:
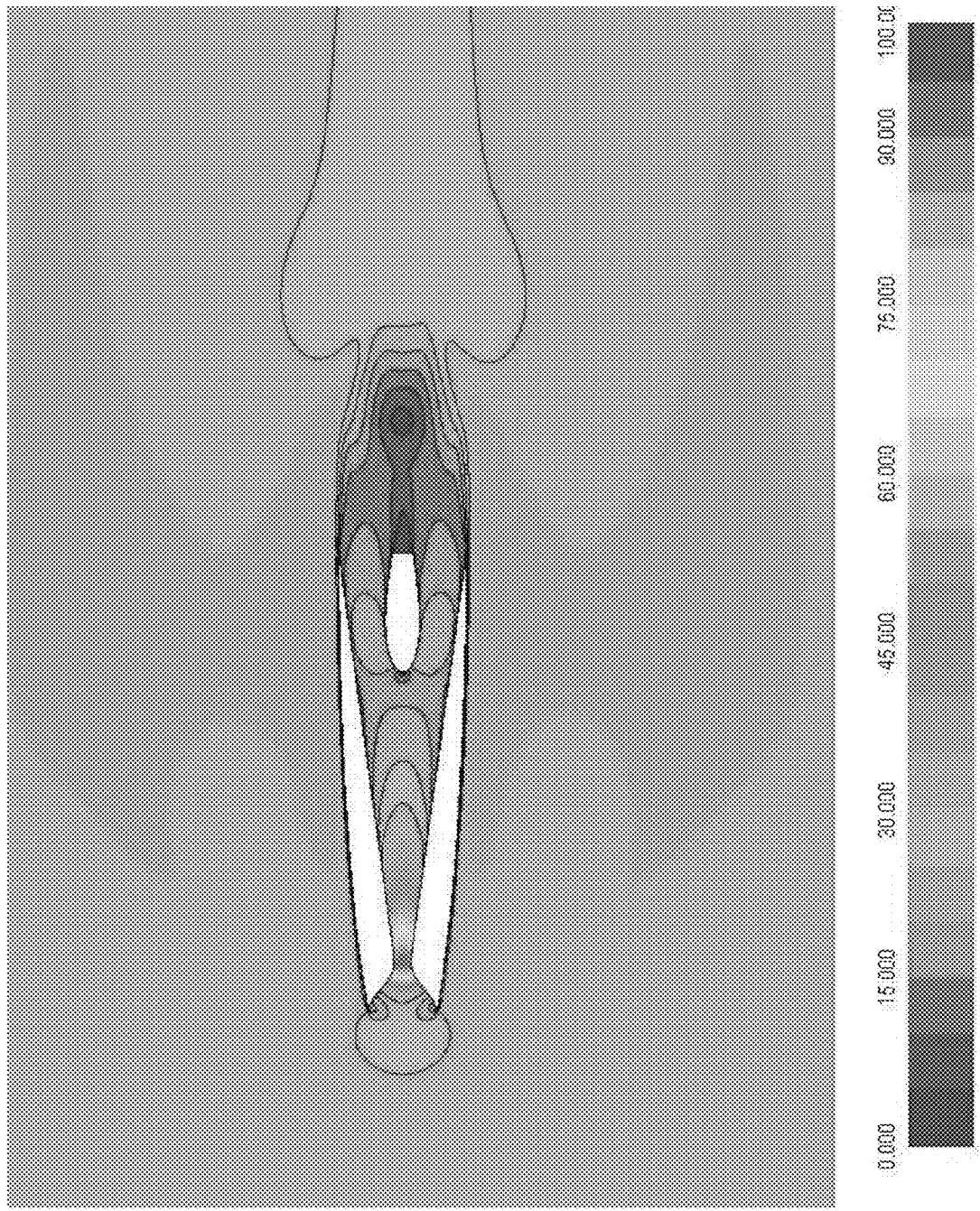

Reference is now made to FIG. 4 which shows external diffusers 400 placed around the Tube Covers 402. FIG. 5 shows the corresponding air flow. The goal of using external diffusers 400 is reducing local air velocities approaching the tube cover 402. To achieve the goal, the two-dimensional (2D) tube cover has been located inside the subsonic diffuser.

A roll of these diffusers is to reduce the local air speed mainly above and beneath the tube cover and thus significantly increase the low speed region.

One possibility for the diffuser is to provide a linear diffuser, which is a subsonic diffuser based on the principle of a de-Laval converging-diverging nozzle. The added diffuser increases the longitudinal or chordwise extent of the low speed region downstream of the tube cover 402 to a length of about 10 cm. However, the height of the region barely changes relative to the case of the tube cover alone, thus again making the solution impractical as such.

The analysis shows that without having the tube cover 402 inside the diffuser, there are flow separations. As shown in FIG. 5, with the tube cover, the flow separations are prevented, thus allowing for a small size diffuser, which would otherwise not be possible.

Figure 6:
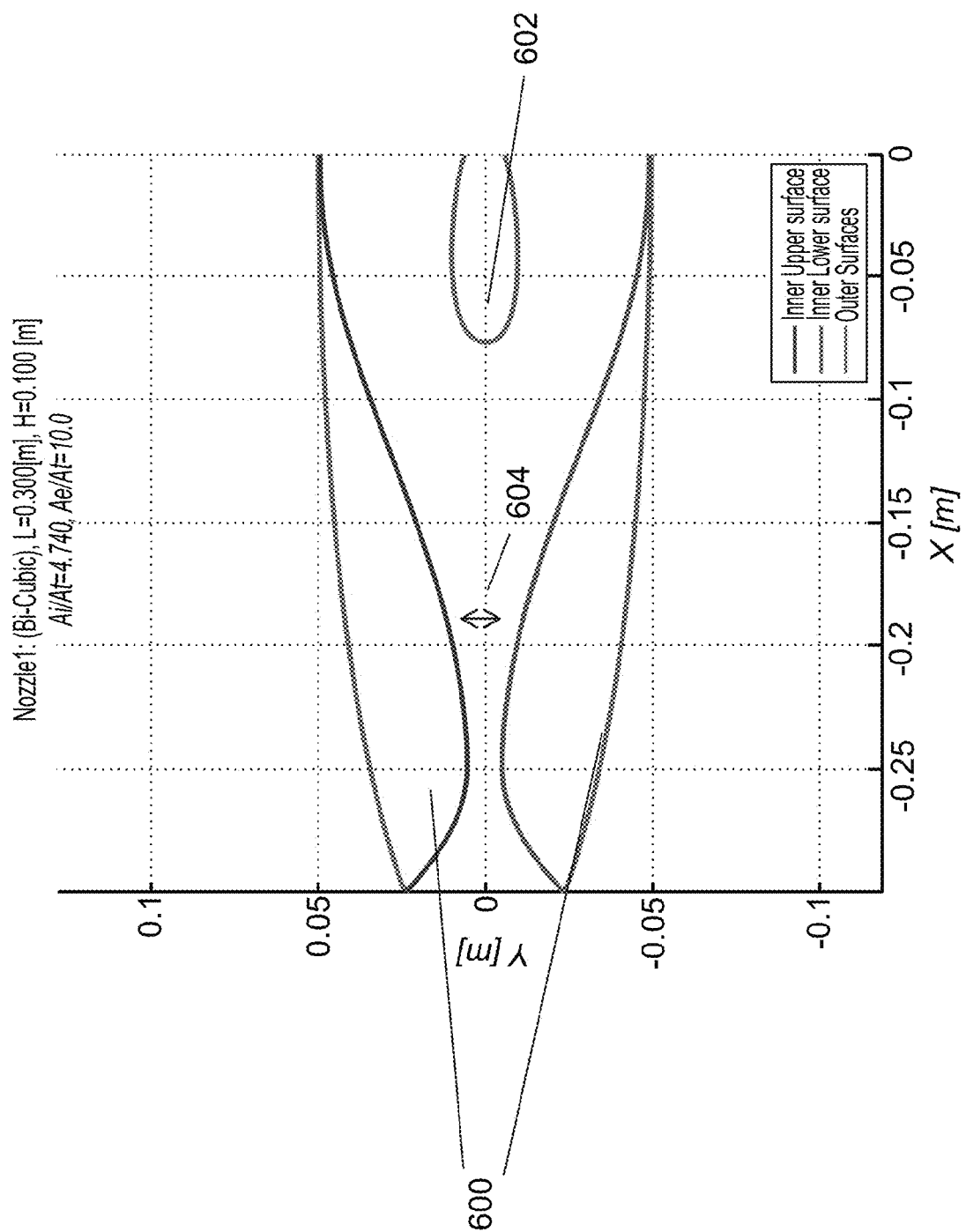
Figure 7:
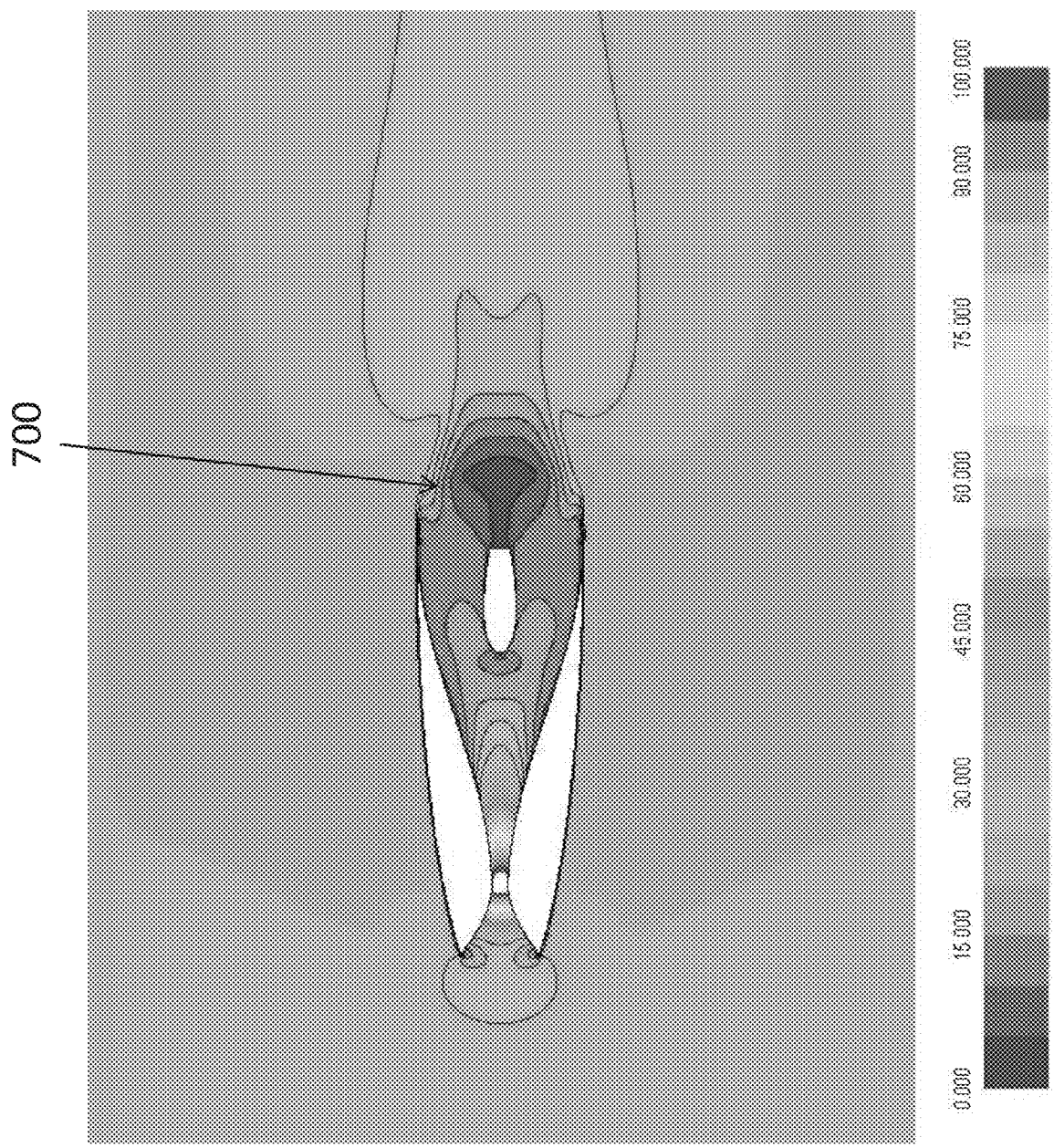

Reference is now made to FIG. 6, which shows a cubic diffuser 600 around tube cover 602, and to the corresponding analysis in FIG. 7. Here the curvature of the diffuser is changed, resulting in an increase of the low velocity volume 700 at the exit point as shown in FIG. 7. Lower velocities overall were achieved in addition to the increase in the low velocity volume. As before, the presence of the Tube Cover 602 inside the diffuser helps set the rate of growth of the effective diffuser height, thus preventing massive flow separation. However there are high velocities at the throat.

Figure 8:
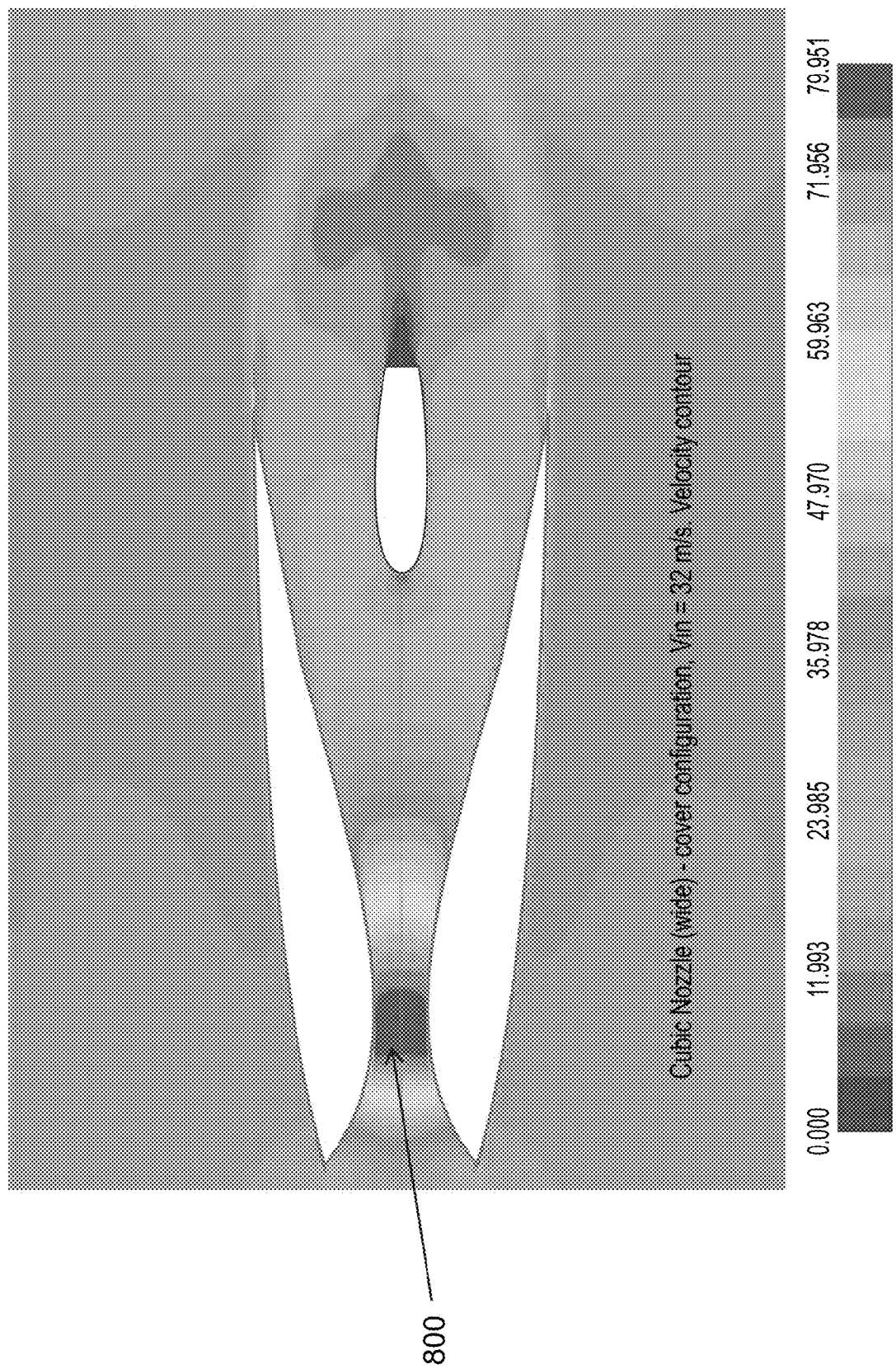

Referring now to FIG. 8, the effect of a wide cubic diffuser is shown. Specifically, since the velocity at the throat for the cubic diffuser was very high, the inventors checked how the spacing between the upper and left parts of the diffuser affect the velocity at the throat. Specifically, upper and lower parts of the diffuser were moved apart, thereby doubling the throat height, marked by arrow 604 in FIG. 6. As a result, the maximum velocity at the throat, region 800 in FIG. 8, was reduced.

Figure 10:
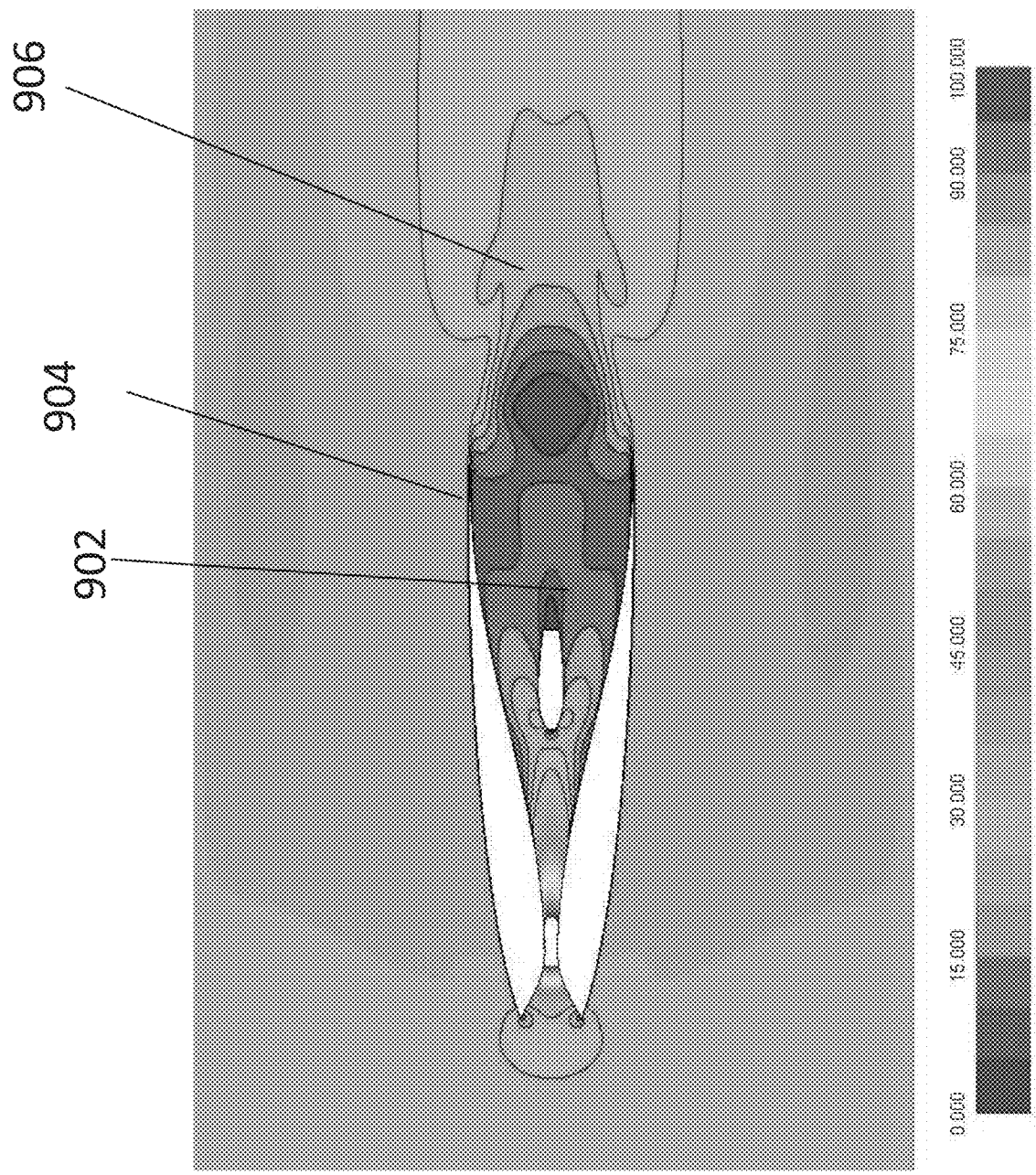

Reference is now made to FIG. 9 which an extended cubic diffuser 900, in which the diffuser exit area 902 is increased. The ambient velocity is thus decreased in the exit area 902, as shown in corresponding air velocity diagram FIG. 10. It is noted that the reduced velocity region in FIG. 10 extends well behind the end 904 of the nozzle in a plume shaped extension 906. The pipe cover is designated 904.

Reference is now made to FIG. 11 which is an air velocity diagram for a cubic diffuser with base bleed velocity.

In the preceding air velocity diagrams it is seen that sometimes the flow reduces, then increases, and then reduces again.

The flow is effected by parameters such as tube cover location, cover dimensions, diffuser dimensions and others, and we now consider analyzing the flow when blowing air outside of the tube covers by slightly pressurizing the pipe. The base of the tube cover is not assumed to be a solid wall, as before, but a longitudinal velocity of 1 m/s is specified exiting from the pipe. The velocity of 1 m/s was used in the analysis but a range of air velocities around the 1 m/s mark and above are also suitable. In fact, the higher the pipe velocity, the smaller the transition to the speed of the ambient air. The main upper constraint on the pipe air velocity is the effect on the insects.

The low speed region 1100 as shown in FIG. 11 extends over the width of the nozzle and has a plume shaped extension 1102. The 1 m/s base bleed velocity may achieve a significantly increase in the extent of the horizontal limits of the low speed flow region and considerable lengthening of the plume 1102 behind the nozzle. Furthermore, the base bleed velocity appears to eliminate the phenomenon of lower-higher-lower speed.

Additional options include having the blowing pipe, that is the pipe expelling the mosquitoes, set at some specific angle. Control of the quality of flow inside the diffuser can be manipulated by setting such angles, rather in the manner of a rotatable nozzle of a vectored thrust aircraft. Also each pipe may be set at a different angle.

In such an example, a low speed region behind the diffuser may extend to almost a meter long.

Reference is now made to FIG. 12, which is a simplified diagram showing air flow velocities resulting from the nozzle shape of FIG. 1 when air exits the insect delivery tube at a velocity of around 1 m/s. Again, an elongated region of reduced and gradually changing velocity 1200 emerges from behind the nozzle.

Reference is now made to FIG. 13, which is a simplified diagram showing air flow velocities resulting from a variation of the nozzle shape of FIG. 1 wherein the throat 1300 of the nozzle is widened. Again, air exits the insect delivery tube at a velocity of around 1 m/s, and an elongated region 1302 of gradually changing velocity emerges from behind the nozzle. As compared with FIG. 12, the elongated region is longer and smoother.

Reference is now made to FIG. 14 which illustrates the diffuser situated on the wing of an aircraft. As shown, the diffuser 1400 is mounted on struts 1402, 1404 to extend behind wing 1406, to serve as a sort of winglet. Multiple tubes within the winglet blow the mosquitoes along using a slight overpressure. Thus the tubes provide both the mosquitoes for distribution and the base velocity bleed for setting up the air volume.

The diffuser may use composite materials and may be a three-piece structure for easy transportation and lower cost, or a single piece construction for structural simplicity.

Reference numeral 1410 indicates a cross section of the diffuser and showing tube 1412 that provides the mosquitoes and base velocity bleed. Aerodynamically shaped tube cover 1414 is also shown. As with the nozzle, the tube cover may also be elongated to extend over the length of the diffuser.

As discussed above, for aircraft with a high-wing, an axisymmetric version of the diffuser may be provided.

It is expected that during the life of a patent maturing from this application many relevant insect control programs will be developed and the present embodiments may provide insect distribution for any such programs, and for any other purposes that may be developed, including pollination programs.

As used herein velocity values unless otherwise specified refer to the value given ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of setting up an air velocity gradient, the method comprising:

flying an aircraft in excess of stall speed and ambient air, the aircraft having a diffuser mounted thereon, the diffuser being for distributing insects from an aircraft, the diffuser being mountable on the aircraft, the diffuser comprising:

at least one distribution tube for connection to a source at a first end and open to an outside of the distribution tube at a second end for distribution of the insects;

a nozzle surrounding the second end, the nozzle narrowing towards a throat and widening downstream of said throat and being configured to allow part of a flight airstream to enter the diffuser and decrease in velocity downstream of said throat;

and a tube cover surrounding the second end within the nozzle, the tube cover having an open aerofoil-shaped cross section, the tube cover and the second end both being located downstream of said throat, the diffuser thereby shielding the insects being distributed, the diffuser thereby forming an air transition volume, the air transition volume comprising a first transition volume part immediately behind an opening of said distribution tube, at a location shielded by said tube cover and surrounded by said nozzle;

setting up the air transition volume using the diffuser, the air transition volume being between the aircraft flying in excess of an aircraft stall speed and in excess of 110 km/h, and the ambient air, the air transition volume being set up by the diffuser to comprise:

the first transition volume part immediately behind the opening of said distribution tube of the diffuser, at a location shielded by said tube cover and surrounded by said nozzle, the first transition volume part defined by an airspeed of air exiting the opening at a velocity of at least 1 m/s less than a speed of the aircraft;

successive further transition volume parts receding from the first transition volume part rearwardly of the diffuser, said further transition volume parts eventually merging into the ambient air, the transition volume being characterized by a maximum wind shear over any cubic centimeter volume within the air transition volume being less than 60 km/h.

2. The method of claim 1, further comprising:
using overpressure to push insects out of an insect source into the first end of said tube;
and allowing the insects to exit the tube at a second end into the air transition volume.

3. A method of setting up an air velocity gradient comprising:
flying an aircraft in excess of stall speed and ambient air, the aircraft having a diffuser mounted thereon, the diffuser being for distributing insects from an aircraft, the diffuser being mountable on the aircraft, the diffuser comprising:
at least one distribution tube for connection to a source at a first end and open to an outside of the distribution tube at a second end for distribution of the insects;
a nozzle surrounding the second end, the nozzle narrowing towards a throat and widening downstream of said throat and being configured to allow part of a flight airstream to enter the diffuser and decrease in velocity downstream of said throat;
and a tube cover surrounding the second end within the nozzle, the tube cover and the second end both being located downstream of said throat, the diffuser thereby shielding the insects being distributed, by forming an air transition volume, the air transition volume comprising a first transition volume part immediately behind an opening of said distribution tube, at a location shielded by said tube cover and surrounded by said nozzle;
setting up the air transition volume using the diffuser, the air transition volume being between the aircraft flying in excess of an aircraft stall speed and in excess of 110 km/h, and the ambient air, the air transition volume being set up by the diffuser to comprise:
the first transition volume part immediately behind the opening of said distribution tube of the diffuser, at a location shielded by said tube cover and surrounded by said nozzle, the first transition volume part defined by an airspeed of air exiting the opening at a velocity of at least 1 m/s less than a speed of the aircraft;
successive further transition volume parts receding from the first transition volume part rearwardly of the diffuser, said further transition volume parts eventually merging into the ambient air, the transition volume being characterized by a maximum wind shear over any cubic centimeter volume within the air transition volume being less than 60 km/h.

* * * * *